(12) United States Patent
Ochiai

(10) Patent No.: US 6,241,279 B1
(45) Date of Patent: Jun. 5, 2001

(54) AIR BAG DEVICE

(75) Inventor: Fumiharu Ochiai, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/318,750

(22) Filed: May 26, 1999

(30) Foreign Application Priority Data

| May 26, 1998 | (JP) | 10-143782 |
| May 26, 1998 | (JP) | 10-143785 |
| May 26, 1998 | (JP) | 10-143786 |

(51) Int. Cl.[7] .............................. B60R 21/32; B60R 21/30
(52) U.S. Cl. ........................ 280/735; 280/739; 280/742
(58) Field of Search ................................ 280/735, 739, 280/736, 741, 742

(56) References Cited

U.S. PATENT DOCUMENTS

| 5,388,860 | * | 2/1995 | Brede et al. | 280/739 |
| 5,670,853 | * | 9/1997 | Bauer | 318/286 |
| 5,695,214 | * | 12/1997 | Faigle et al. | 280/735 |
| 5,707,078 | * | 1/1998 | Swanberg et al. | 280/739 |
| 5,709,405 | * | 1/1998 | Saderholm et al. | 280/736 |
| 5,743,558 | * | 4/1998 | Seymour | 280/739 |
| 5,769,452 | * | 6/1998 | Yoshida | 280/735 |
| 5,853,192 | * | 12/1998 | Sikorski et al. | 280/739 |
| 6,017,056 | * | 1/2000 | Lee | 280/739 |
| 6,039,346 | * | 3/2000 | Ryan et al. | 280/736 |

* cited by examiner

Primary Examiner—Paul N. Dickson
(74) Attorney, Agent, or Firm—Sughrue, Mion, Zinn, Macpeak & Seas, PLLC

(57) ABSTRACT

In a retainer 19 which supports an inflator 20 and an air bag 21 of an air bag device Rd, disposed are a control valve 30 configured by bonding a plate-like piezoelectric element 31 to a protector 21 made of a metal, vent holes 29 which are opened and closed by the control valve 30, and internal-pressure detecting means 35d for detecting the internal pressure of the air bag 21. The piezoelectric element 31, which, when not energized, closes the vent holes 29, is caused to bend by energization, so as to open the vent holes 29, thereby allowing a gas in the air bag 21 to be discharged to the outside. The opening degree of the vent holes 29 is feedback controlled in accordance with the air bag internal pressure detected by the internal-pressure detecting means 35d, so that the change of the air bag internal pressure with respect to the elapse of time coincides with a preset internal-pressure pattern. Accordingly, the internal pressure of an air bag is correctly controlled by changing the amount of a gas which is discharged through a vent hole when the air bag develops.

16 Claims, 26 Drawing Sheets

AIR BAG DEVICE

BACKGROUND OF THE INVENTION

1. Field of the Invention

The present invention relates to an air bag device in which an inflator is housed in a retainer to which a periphery of an opening of a folded air bag is fixed, and the air bag is inflated to develop by a gas which is generated by the inflator when a vehicle collides or the like (in other words, a vehicle is subject to a predetermined rapid acceleration/deceleration or more), thereby restraining an occupant.

2. Description of the Prior Art

In an air bag device of the prior art, a vent hole is formed in an air bag which is to be inflated by a gas generated by an inflator, so that the gas is partly discharged through the vent hole to control the internal pressure of the air bag. A structure of such an air bag device is proposed in which a vent hole is closed by a membrane so that an air bag is rapidly inflated in an initial development stage, and, when the development is completed and the internal pressure of the air bag is raised, the membrane is broken to discharge a gas through the vent hole, thereby gently restraining an occupant. Such as conventional air bag device can be seen in a Japanese tility Model Unexamined Publication (Kokoku) No. HEI. 5-6206.

In addition, a Japanese Patent Unexamined publication No. EI. 9-301115 suggests another air bag device in which two inflators are disposed, both the two inflators are ignited when no passenger exists in the vicinity of the air bag device, and only one of the inflators is ignited when a passenger exists in the vicinity of the air bag device, whereby the development speed and internal pressure of an air bag are controlled in accordance with the position of a passenger (see Japanese Patent Publication (Kokai) HEI 9-301115).

The conventional air bag device disclosed in the Japanese Utility Model Unexamined Publication No. HEI. 5-6206 has problems. One of the problems is that the pressure at which the membrane is broken is easily dispersed, and hence it is difficult to correctly open the vent hole when the internal pressure reaches the predetermined value. The other problem is that it is difficult to accurately control the internal pressure, because the vent hole which has been once opened cannot be again closed.

Further, the conventional air bag device disclosed in the Japanese Patent Publication (Kokai) HEI. 9-301115 also has problems. One of the problem is that the two inflators are required and hence the number of parts is increased, thereby increasing the production cost. The other problem is that the control cannot be finely conducted, because the development of the air bag is controlled in only two stages (that is, one stage in which a single inflator is ignited, or the other stage in which both inflators are ignited).

SUMMARY OF THE INVENTION

The present invention has been conducted in view of the above-discussed circumstances.

Therefore, it is an object of the present invention to provide an air bag device having a simple structure which enables a vent hole of an air bag device to be correctly opened and closed.

In addition, it is another object of the present invention to provide an air bag device capable of correctly controlling the internal pressure of an air bag by changing the amount of a gas which is discharged through a vent hole when the air bag develops.

The above-mentioned object can be attained by an air bag device according to a first aspect of the present invention in which an inflator is housed in a retainer to which a periphery of an opening of a folded air bag is fixed, and the air bag is inflated to develop by a gas which is generated by the inflator when a vehicle collides, thereby restraining an occupant, wherein a vent hole formed in the retainer is opened and closed by an actuator configured by a piezoelectric element.

According to this configuration, the amount of the gas which, when a vehicle collides, is generated by the inflator and discharged through the vent hole can be arbitrarily controlled by changing the opening degree of the vent hole by the actuator. Therefore, the development speed of the air bag, the degree of the restraining force of the air bag, the contraction speed of the air bag, and the like can be arbitrarily set in accordance with the condition of the collision and the state of an occupant. Particularly, an actuator configured by a piezoelectric element is simpler in structure and less troublesome than a motor or a solenoid. Therefore, a sure operation can be guaranteed while enabling the number of parts of the actuator to be reduced and the production cost to be lowered.

In the above configuration, preferably, the actuator may be a plate-like piezoelectric element which is placed so as to cover the vent hole, and in which one end is fixed to the retainer.

According to this configuration, the plate-like piezoelectric element having a very simple structure can be provided with both a function as a valve element which opens and closes the vent hole, and that as an actuator which drives the valve element. Consequently, the actuator can be miniaturized and reduced in production cost.

In the above configuration, preferably, a protector configured by a metal plate may be stacked on the piezoelectric element.

According to this configuration, the durability of the piezoelectric element which itself is fragile can be enhanced by stacking thereon the protector configured by a metal plate.

In the above configuration, preferably, plural vent holes may be formed in the retainer, a valve plate having plural openings respectively corresponding to the vent holes may be slidably supported on the retainer, and the valve plate may be slid by the actuator which is configured by stacking piezoelectric elements, thereby opening or closing the vent hole.

According to this configuration, the combination of the plural vent holes formed in the retainer and the plural openings formed in the valve plate enables the opening degree of the vent holes to be changed from a fully closed state to a fully opened state or vice versa, only by moving the valve plate with a small stroke. Therefore, miniaturization of the actuator and improvement of the responsibility can be simultaneously attained.

The objects can be attained by an air bag device according to a second aspect of the present invention in which an inflator is housed in a retainer to which a periphery of an opening of a folded air bag is fixed, and the air bag is inflated to develop by a gas which is generated by the inflator when a vehicle collides, thereby restraining an occupant, wherein the device comprises: plural vent holes formed in the retainer; a valve plate in which plural openings respectively corresponding to the plural vent holes are formed; and an actuator which slides the valve plate along the retainer to cause the plural openings to oppose the plural vent holes.

According to this configuration, since the valve plate is slid by the actuator, so as to change the opening degree of the vent holes, the amount of the gas which, when a vehicle collides, is generated by the inflator and discharged through the vent holes can be arbitrarily controlled. Therefore, the development speed of the air bag, the degree of the restraining force of the air bag, the contraction speed of the air bag, and the like can be arbitrarily set in accordance with the condition of the collision and the state of an occupant. Particularly, the combination of the plural vent holes formed in the retainer and the plural openings formed in the valve plate enables the opening degree of the vent holes to be changed from a fully closed state to a fully opened state or vice versa, only by moving the valve plate with a small stroke. Therefore, miniaturization of the actuator and improvement of the responsibility can be simultaneously attained.

In the above configuration, preferably, the plural vent holes may be arranged in a circumferential direction, and the valve plate may be reciprocally rotated by the actuator.

According to this configuration, the plural vent holes which are arranged in a circumferential direction are opened and closed by the valve plate which is reciprocally rotated by the actuator. As the actuator, therefore, an actuator of the rotational output type, such as a motor can be easily applied.

In the above configuration, preferably, the plural vent holes may be arranged in a linear direction, and the valve plate may be reciprocally linearly moved by the actuator.

According to this configuration, the plural vent holes which are arranged in a linear direction are opened and closed by the valve plate which is reciprocally linearly moved by the actuator. As the actuator, therefore, an actuator of the linear output type, such as a linear solenoid or a stacked piezoelectric element can be easily applied.

The objects can be attained by an air bag device according to a third aspect of the present invention in which an inflator is housed in a retainer to which a periphery of an opening of a folded air bag is fixed, and the air bag is inflated to develop by a gas which is generated by the inflator when a vehicle collides, thereby restraining an occupant, wherein the device comprises: a vent hole formed in the retainer; a control valve which is operated by an actuator to open and close the vent hole; internal-pressure detecting means for detecting an internal pressure of the air bag; and controlling means for feedback controlling an opening degree of the vent hole so that the air bag internal pressure detected by the internal-pressure detecting means coincides with a preset internal-pressure pattern. According to this configuration, the controlling means drives the opening of the control valve by means of the actuator in accordance with the air bag internal pressure detected by the internal-pressure detecting means, so as to change the opening degree of the vent hole, whereby the amount of the gas which is discharged through the vent hole is arbitrarily changed to make the air bag internal pressure coincident with the preset internal-pressure pattern. Therefore, the internal pressure of the air bag can be controlled to an optimum level so that the performance of restraining an occupant can be enhanced.

In the above configuration, preferably, the device may further comprise occupant state detecting means for detecting a state of the occupant, and the controlling means may change the internal-pressure pattern in accordance with the state of the occupant detected by the occupant state detecting means.

According to this configuration, the opening degree of the vent hole can be controlled so as to obtain the internal pressure of the air bag which corresponds to the state of the occupant. Consequently, the level of the internal pressure of the air bag can be optimally set in accordance with the weight of the occupant and a change of the sitting state.

In the above configuration, preferably, the device may further comprise vehicle speed detecting means for detecting a speed of a vehicle, and the controlling means may change the internal-pressure pattern in accordance with the speed of the vehicle detected by the vehicle speed detecting means.

According to this configuration, the opening degree of the vent hole can be controlled so as to obtain the internal pressure of the air bag which corresponds to the speed of the vehicle. Consequently, the level of the internal pressure of the air bag can be optimally set in accordance with the value of the vehicle speed.

In the above configuration, preferably, the actuator may be a piezoelectric element.

According to this configuration, since the actuator is configured by a piezoelectric element, opening and closing of the vent hole can be driven at a lower cost and by a simple structure in which the number of parts is smaller than that of an actuator of another kind such as a motor or a solenoid.

In the above configuration, preferably, the actuator may be a plate-like piezoelectric element which is placed so as to cover the vent hole, and in which one end is fixed to the retainer.

According to this configuration, since the actuator is configured by a plate-like piezoelectric element, the structure of the actuator can be very simplified, and the piezoelectric element itself can be used as a valve element. Therefore, the number of parts can be further reduced and the production cost can be further lowered.

In the above configuration, preferably, the retainer may comprise plural vent holes, and a valve plate in which plural openings respectively corresponding to the plural vent holes are formed, and the actuator may slide the valve plate along the retainer to cause the plural openings to oppose the plural vent holes.

According to this configuration, the combination of the plural vent holes formed in the retainer and the plural openings formed in the valve plate enables the opening degree of the vent holes to be changed from a fully closed state to a fully opened state or vice versa, only by moving the valve plate with a small stroke. Therefore, miniaturization of the actuator and improvement of the responsibility can be simultaneously attained.

In the above configuration, preferably, the plural vent holes may be arranged in a circumferential direction, and the valve plate may be reciprocally rotated by the actuator.

According to this configuration, the vent holes which are arranged in a circumferential direction are opened and closed by the valve plate which is reciprocally rotated by the actuator. As the actuator, therefore, an actuator of the rotational output type, such as a motor can be easily applied.

In the above configuration, preferably, the plural vent holes may be arranged in a linear direction, and the valve plate may be reciprocally linearly moved by the actuator.

According to this configuration, the vent holes which are arranged in a linear direction are opened and closed by the valve plate which is reciprocally linearly moved by the actuator. As the actuator, therefore, an actuator of the linear output type, such as a linear solenoid or a stacked piezoelectric element can be easily applied.

DETAILED DESCRIPTION OF PREFERRED EMBODIMENTS

Hereinafter, the invention will be described in conjunction with embodiments of the invention shown in the accompanying drawings.

Figure 1:
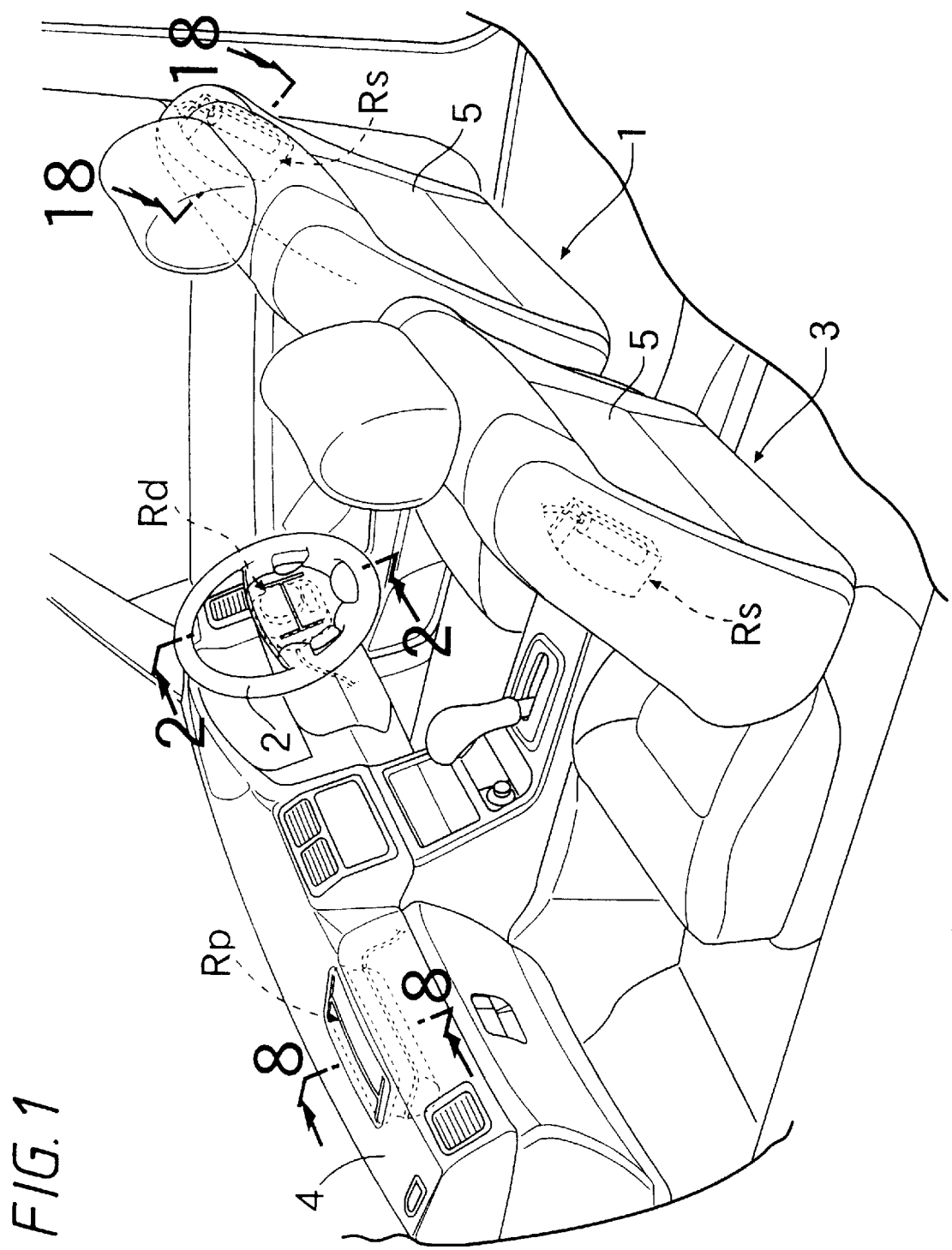
FIG. 1 is a perspective view of a front portion of a cabin of a vehicle.
Figure 2:
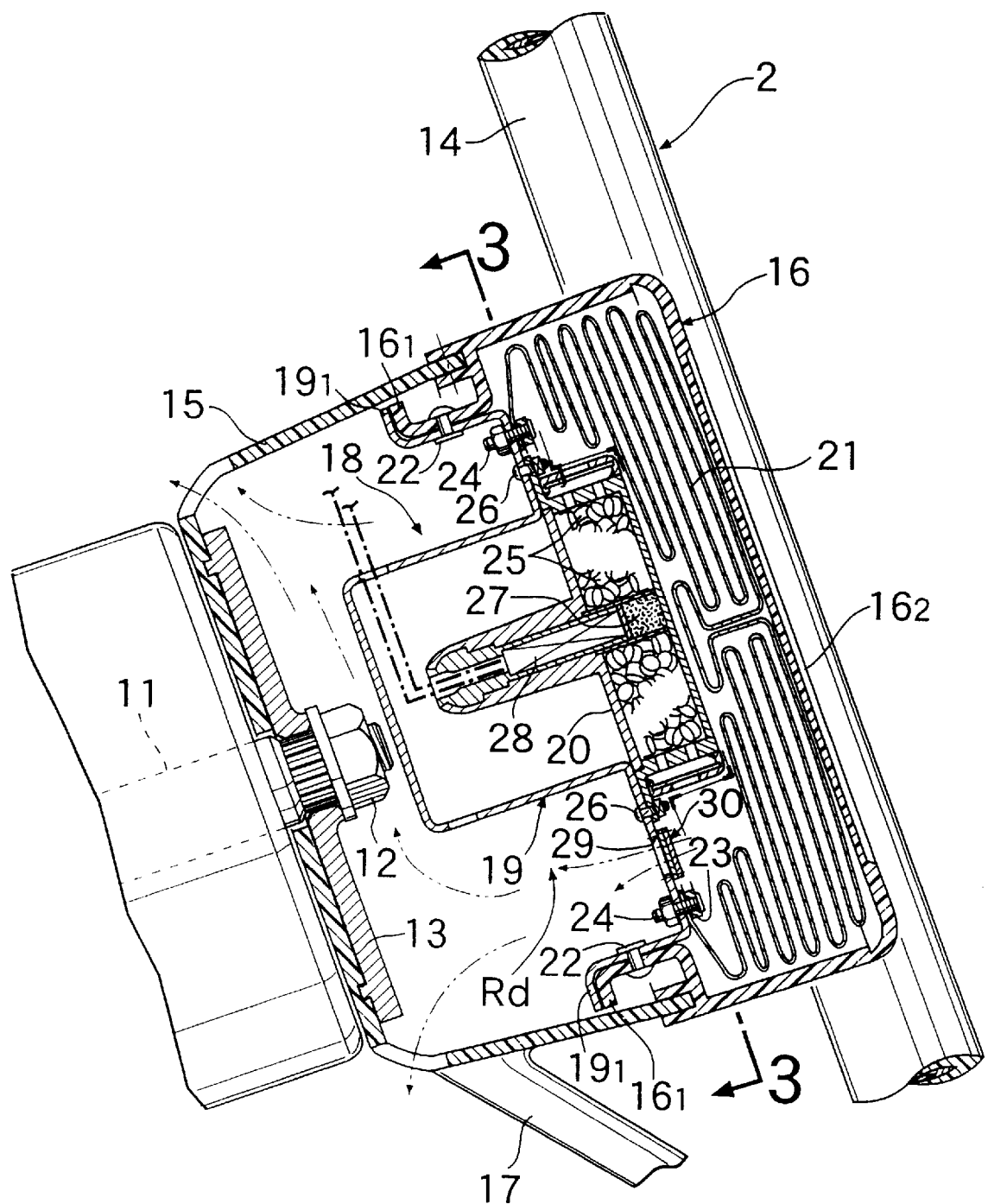
FIG. 2 is an enlarged section view taken along the line 2—2 of FIG. 1.
Figure 3:
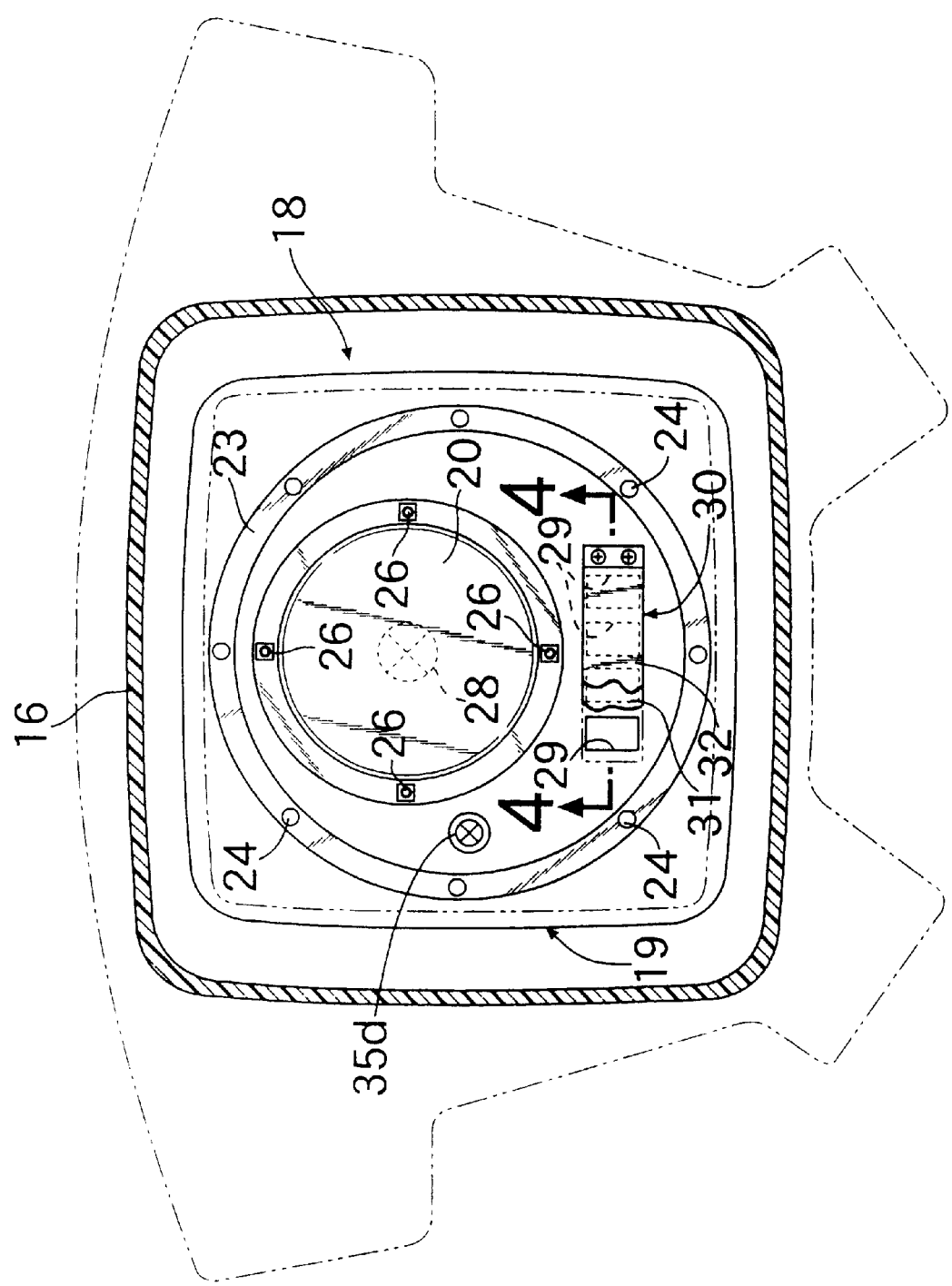
FIG. 3 is a section view taken along the line 3—3 of FIG. 2.
Figure 4A:
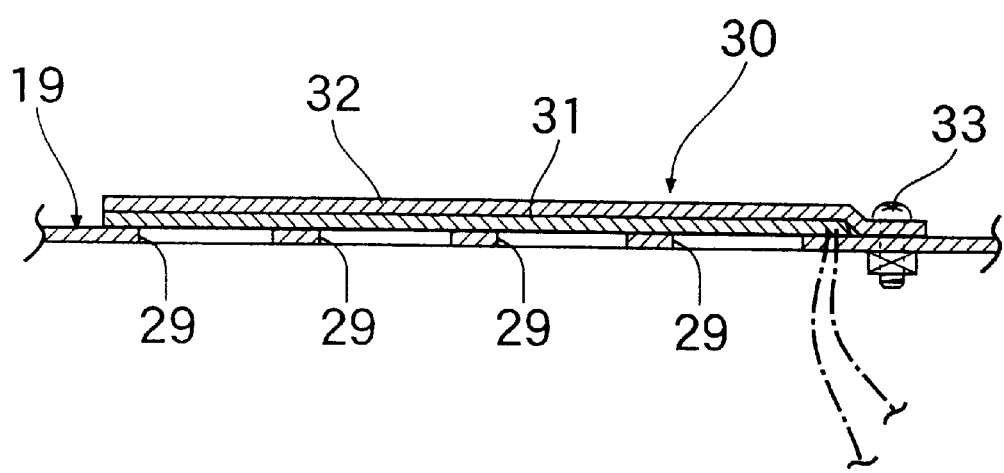
FIGS. 4A–4B are enlarged section view; and taken along the line 4—4 of FIG. 3.
Figure 4B:
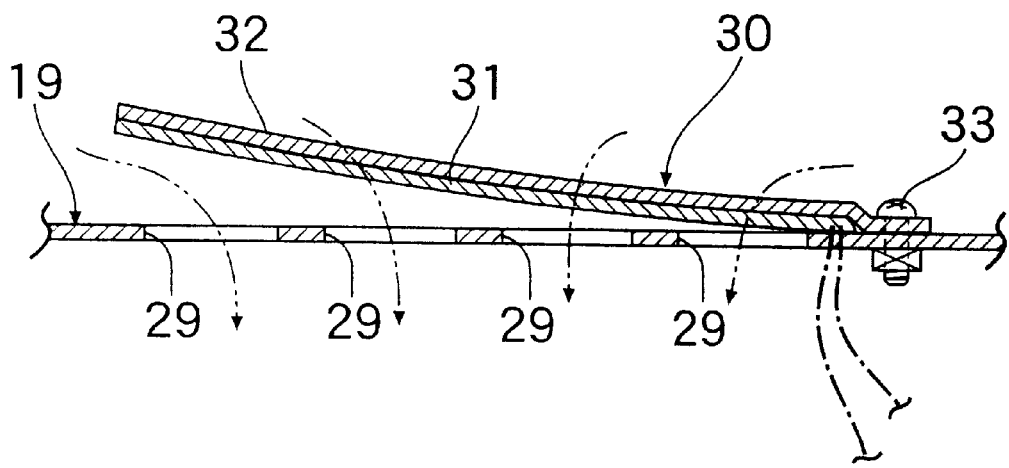
Figure 5:
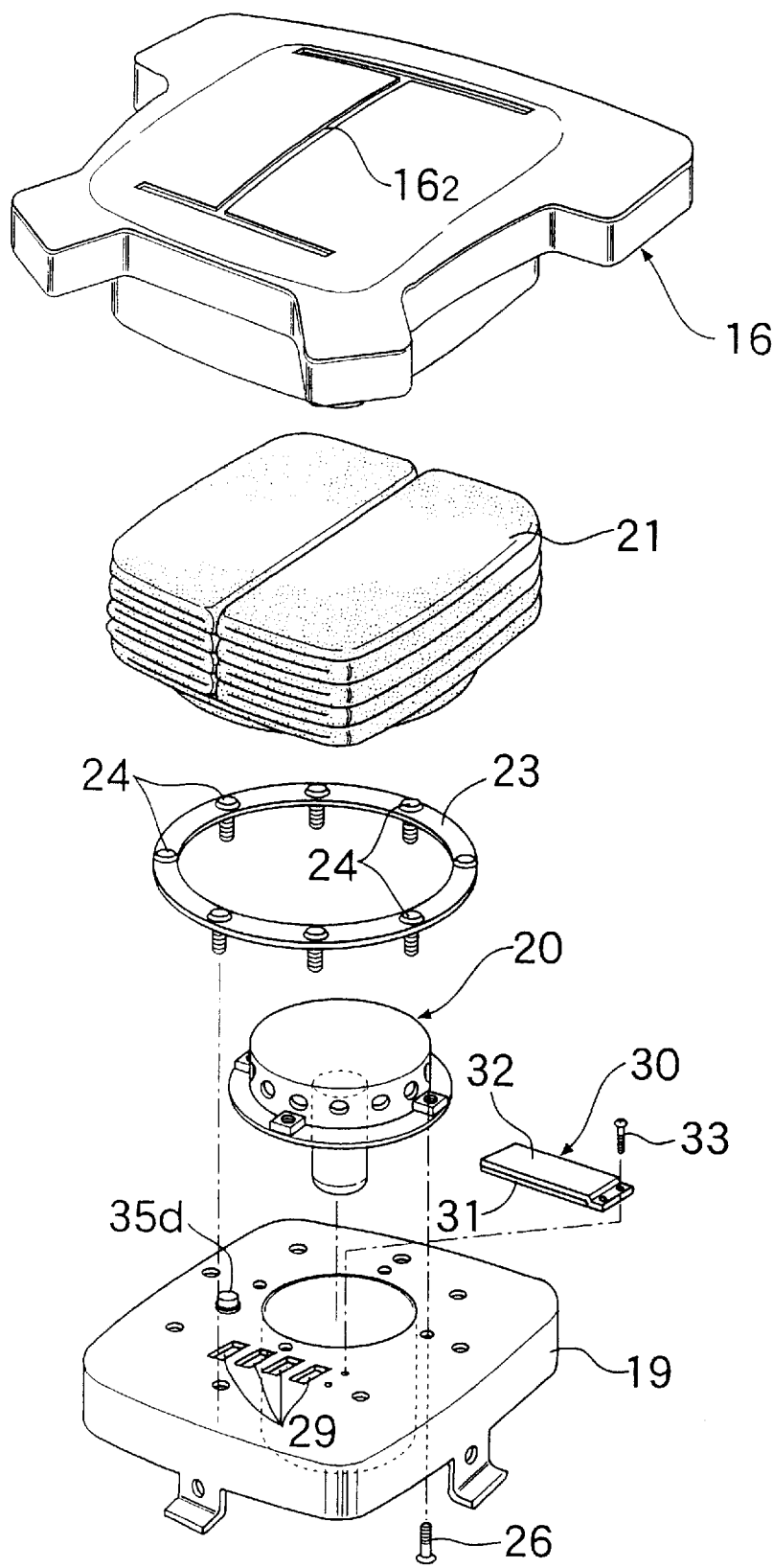
FIG. 5 is an exploded perspective view of an air bag device for a driver's seat.
Figure 6A:
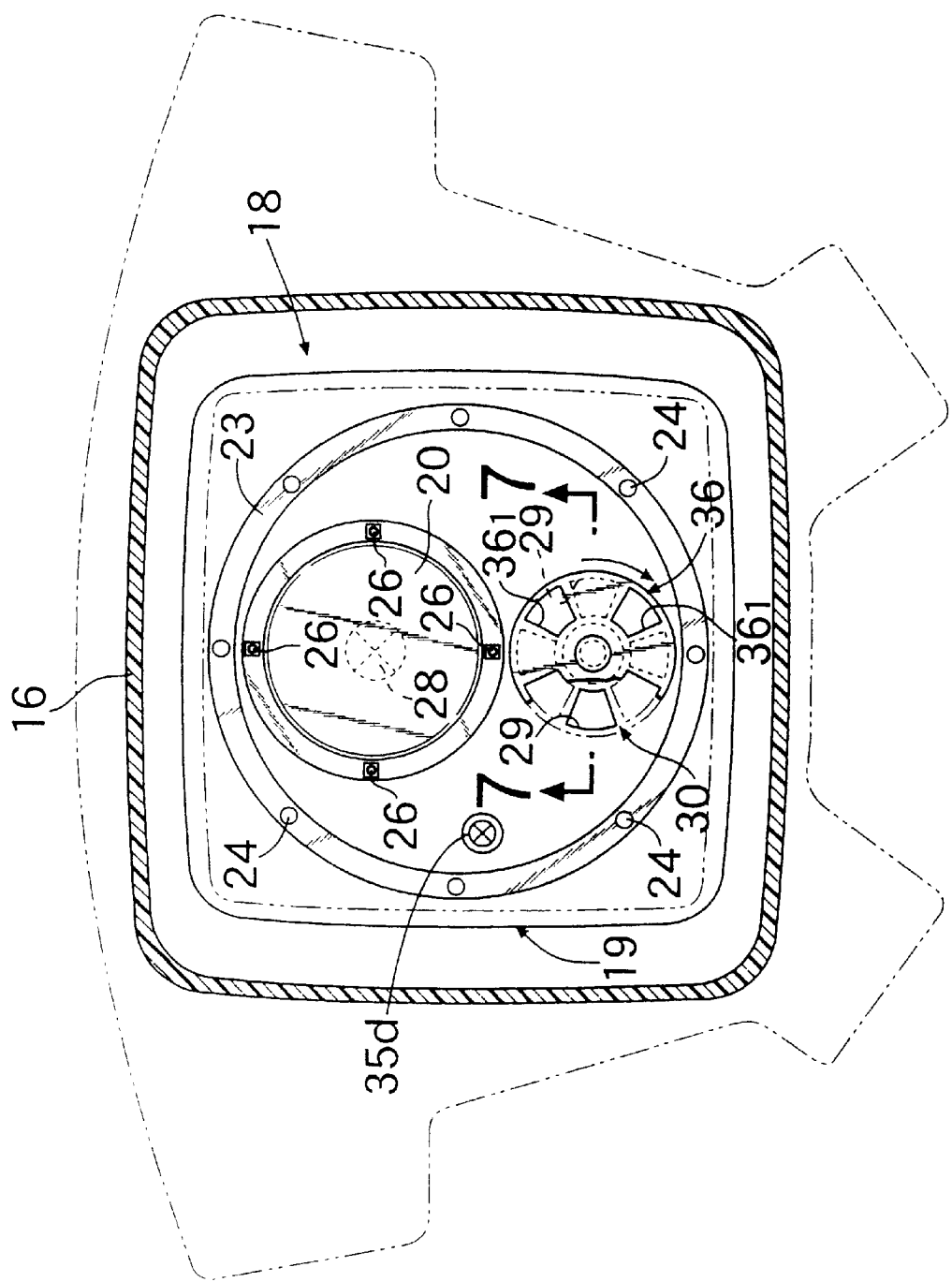
FIG. 6A is a view showing a modification of the air bag device for a driver's seat and corresponding to FIG. 3.
Figure 6B:
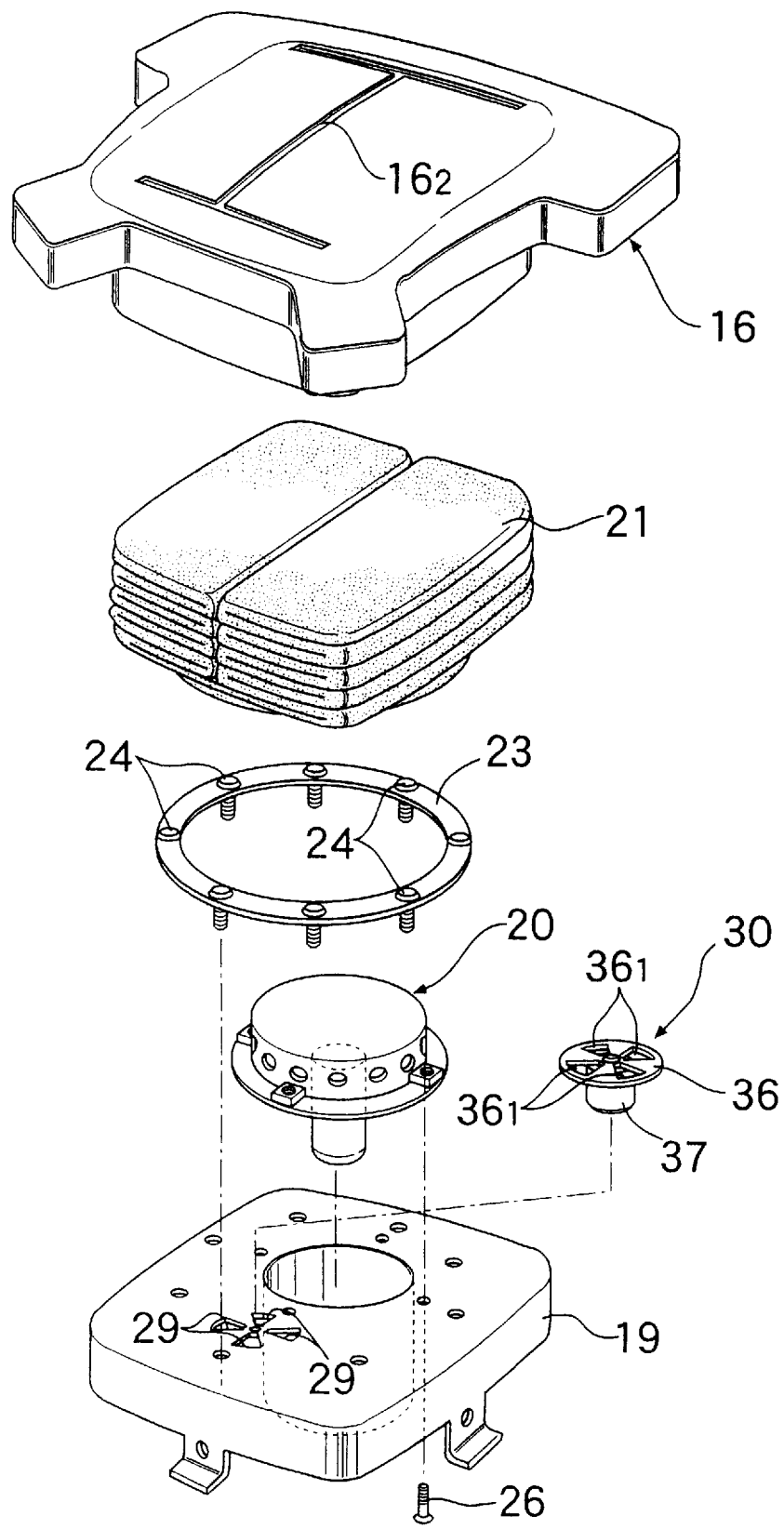
FIG. 6B is an exploded perspective view of the modification of the air bag device for a driver's seat shown in FIG. 6A.
Figure 7A:
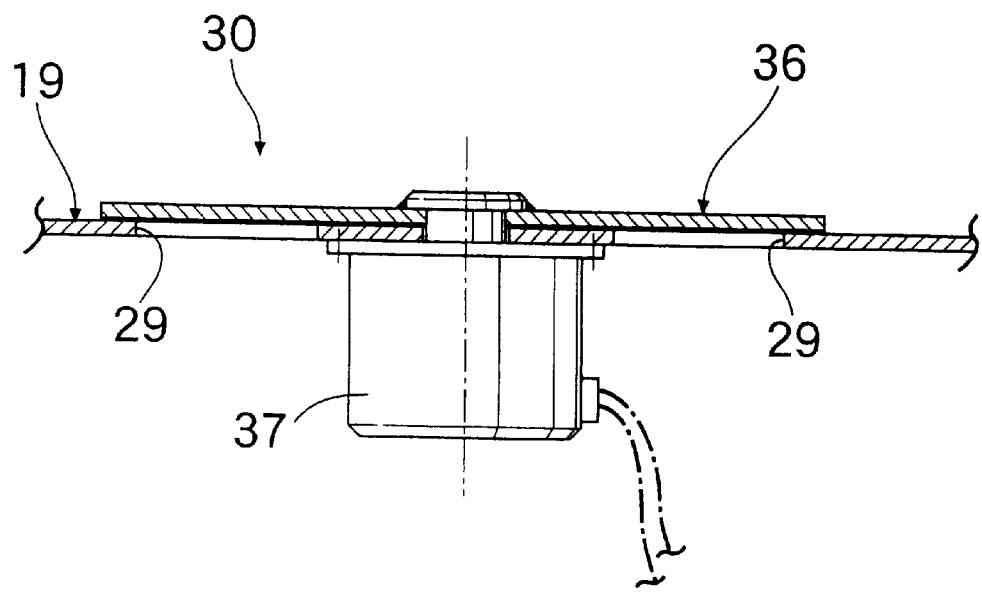
FIGS. 7A–7B are enlarged section views taken along the line 7—7 of FIG. 6A.
Figure 7B:
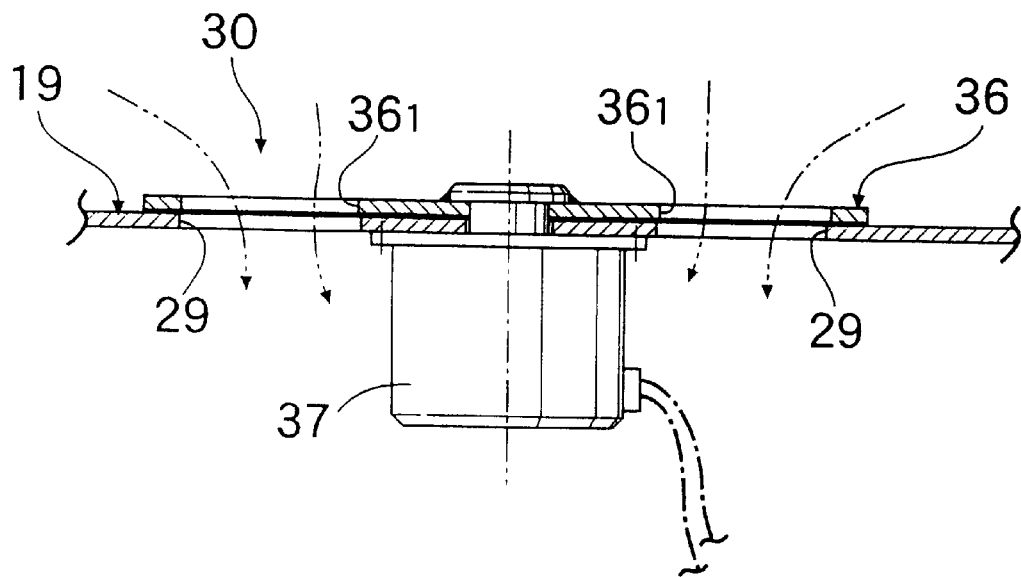
Figure 8:
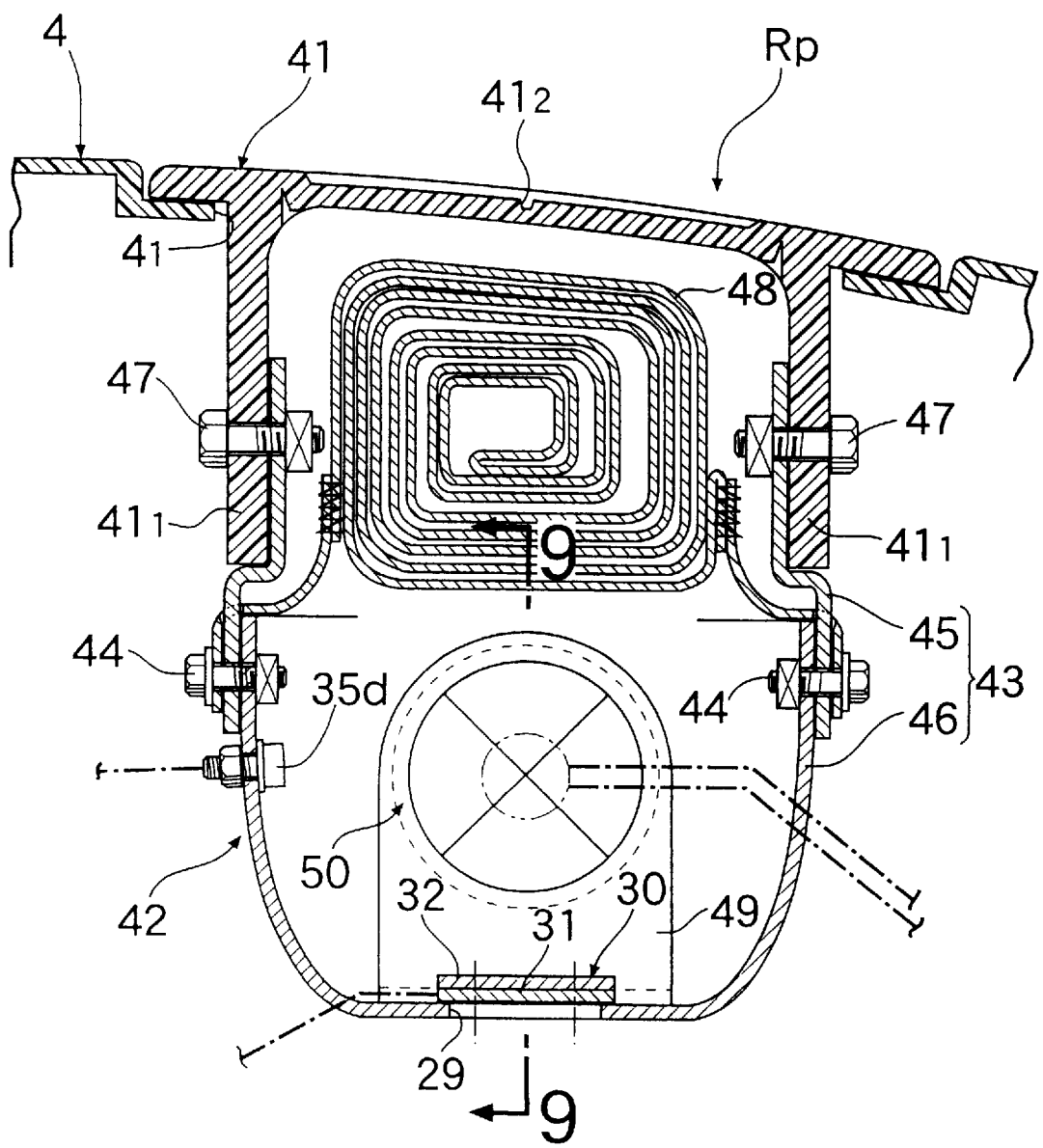
FIG. 8 is an enlarged section view taken along the line 8—8 of FIG. 1.
Figure 9:
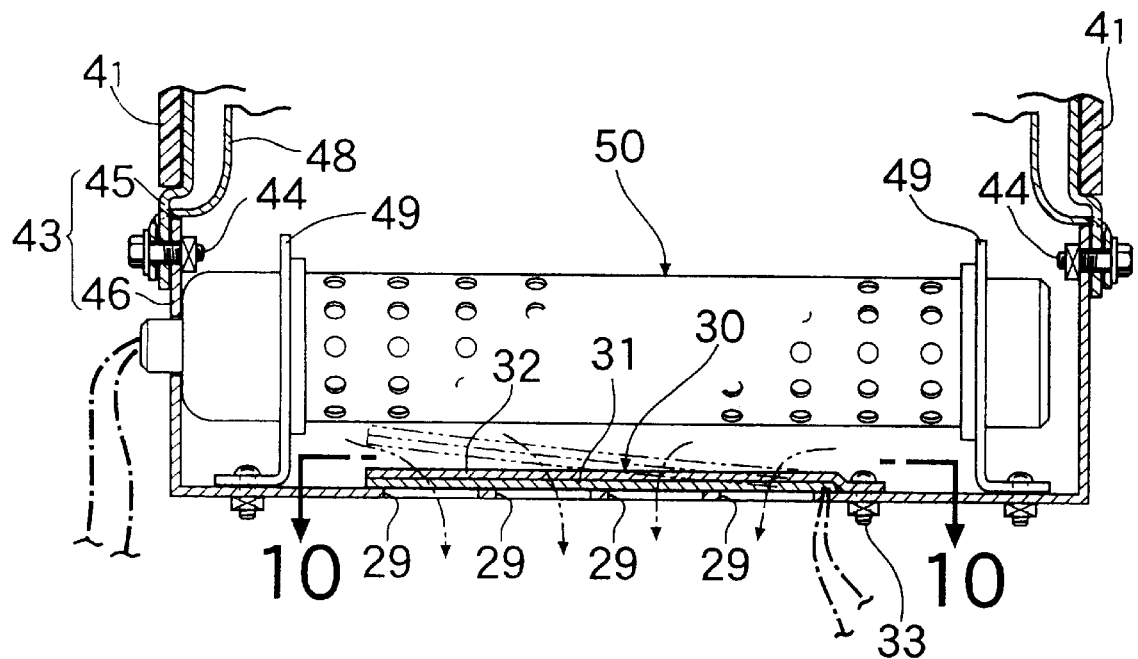
FIG. 9 is a section view taken along the line 9—9 of FIG. 8.
Figure 10:
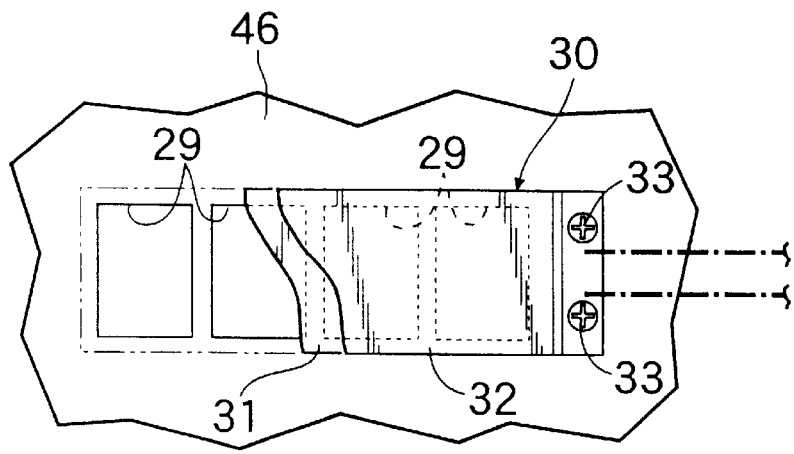
FIG. 10 is a view looking in the direction of the line 10—10 of FIG. 9.
Figure 11:
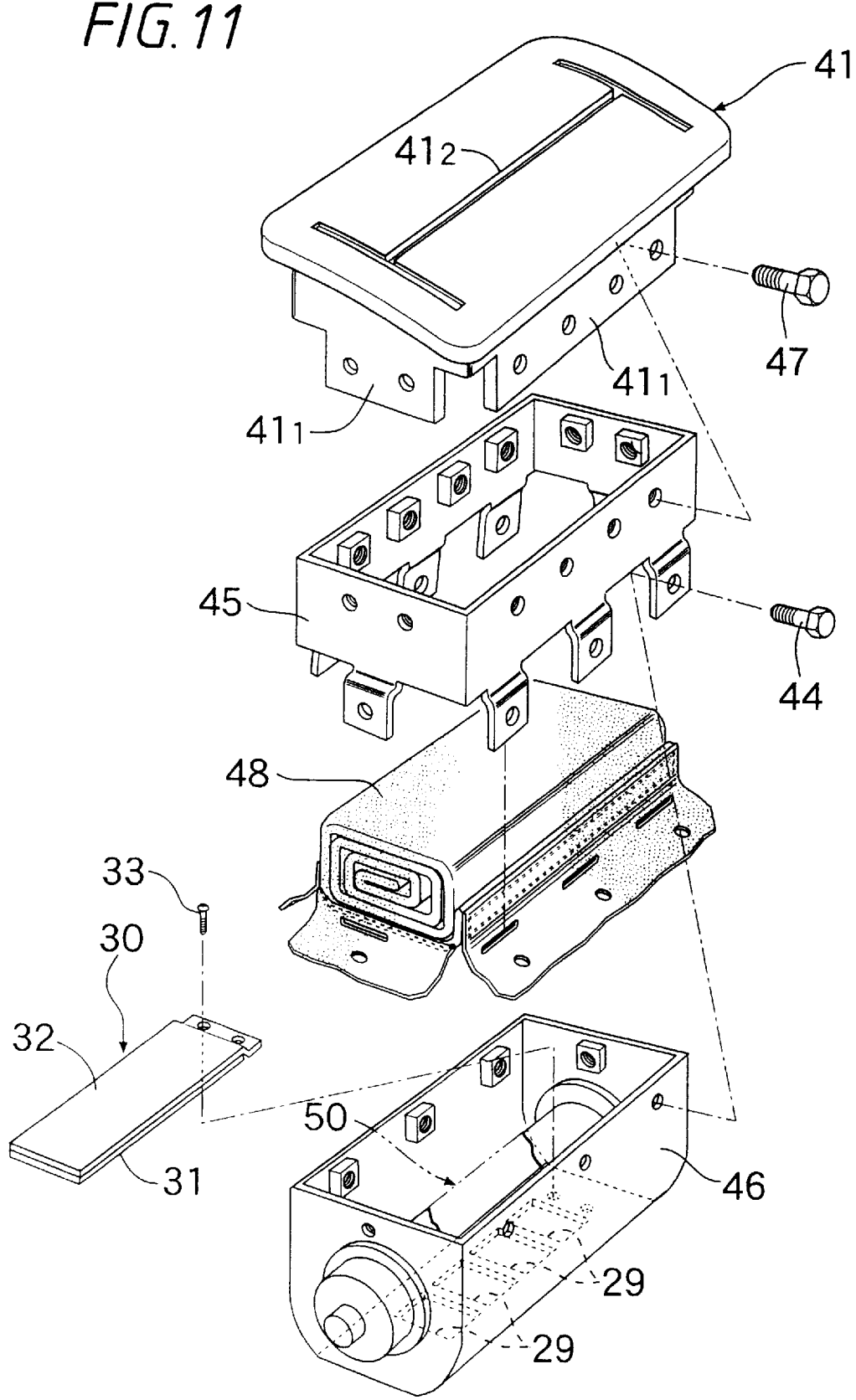
FIG. 11 is an exploded perspective view of an air bag device for a passenger's seat.
Figure 12:
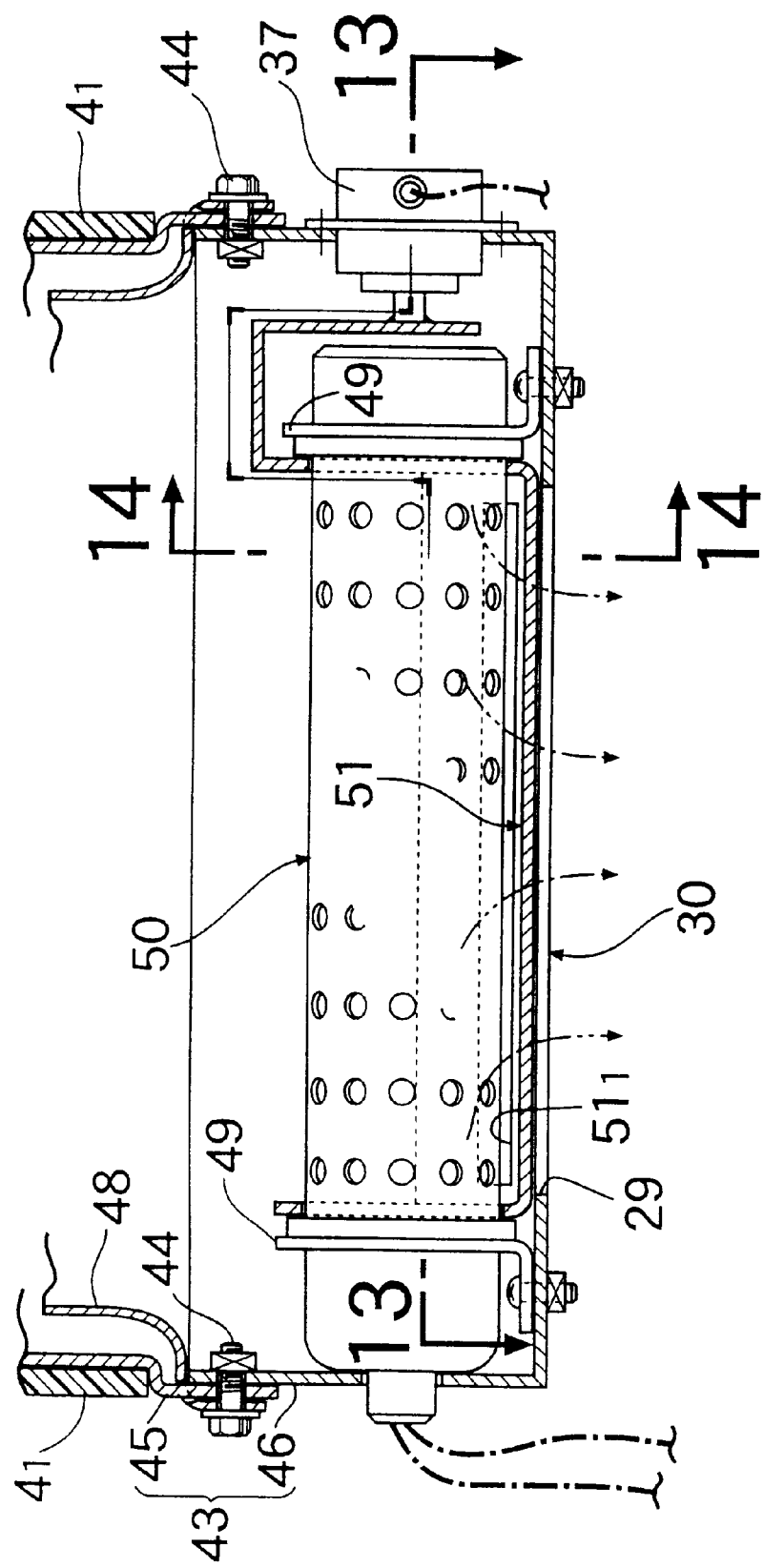
FIG. 12 is a view showing a first modification of the air bag device for a passenger's seat and corresponding to FIG. 9.
Figure 13:
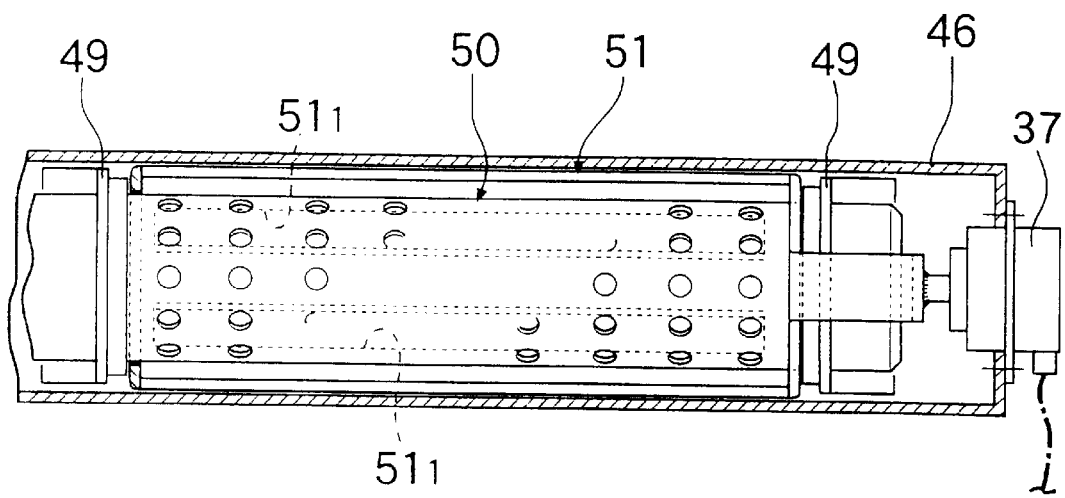
FIG. 13 is a section view taken along the line 13—13 of FIG. 12.
Figure 14A:
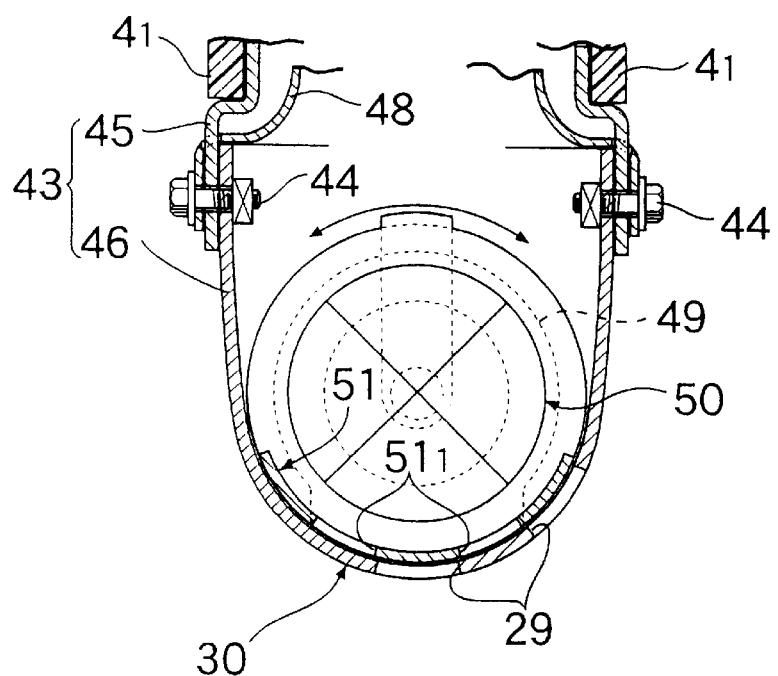
FIG. 14A is a section view taken along the line 14—14 of FIG. 12.
Figure 14B:
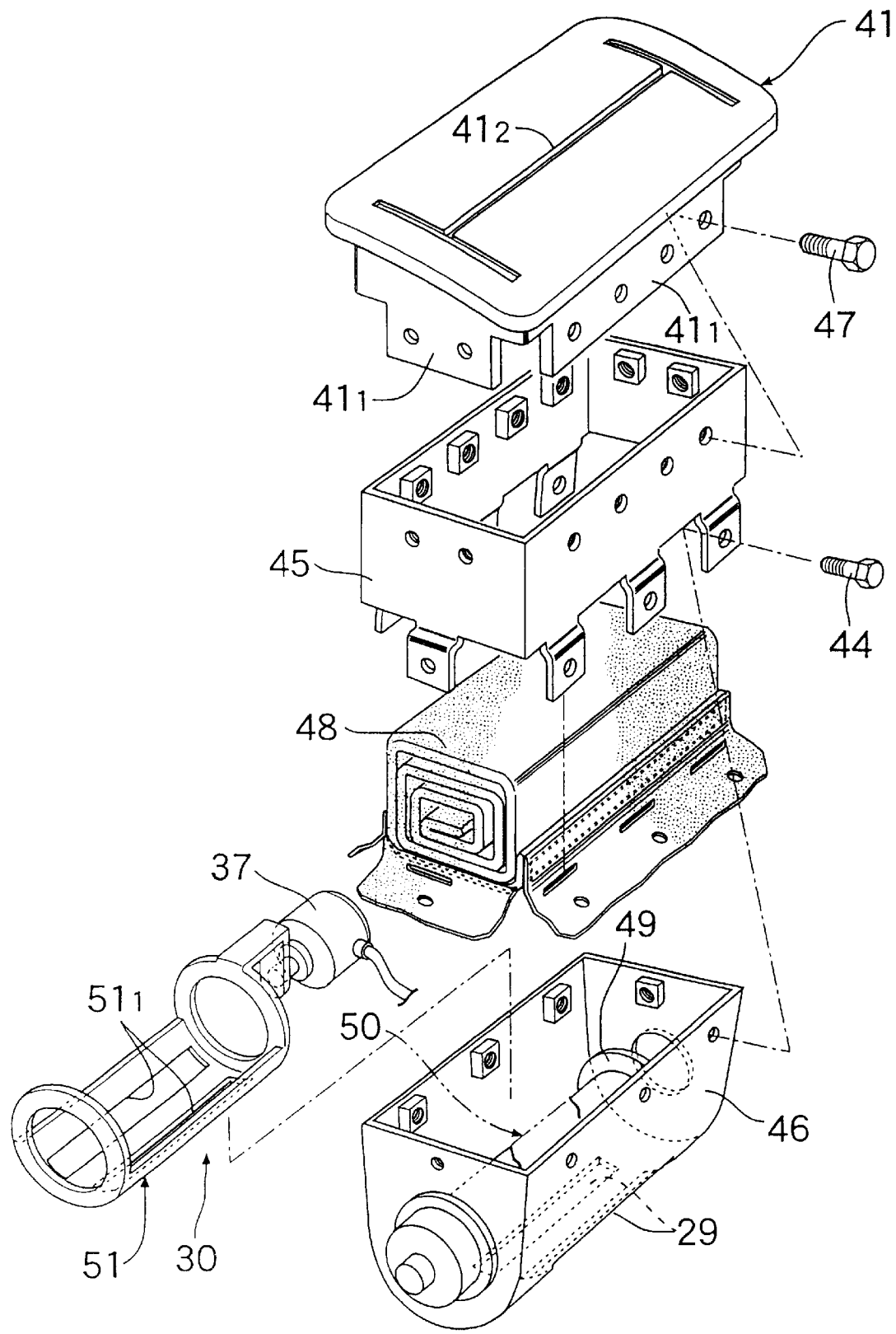
FIG. 14B is an exploded perspective view of the first modification of the air bag device for a passenger's seat shown in FIGS. 12 to 14A.
Figure 15:
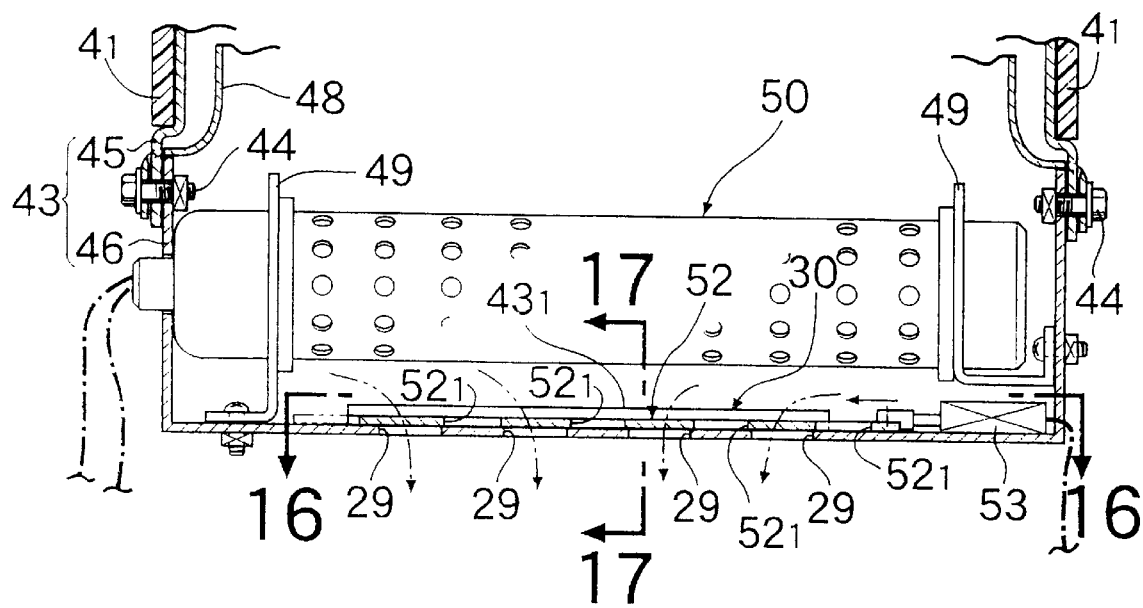
FIG. 15 is a view showing a second modification of the air bag device for a passenger's seat and corresponding to FIG. 9.
Figure 16:
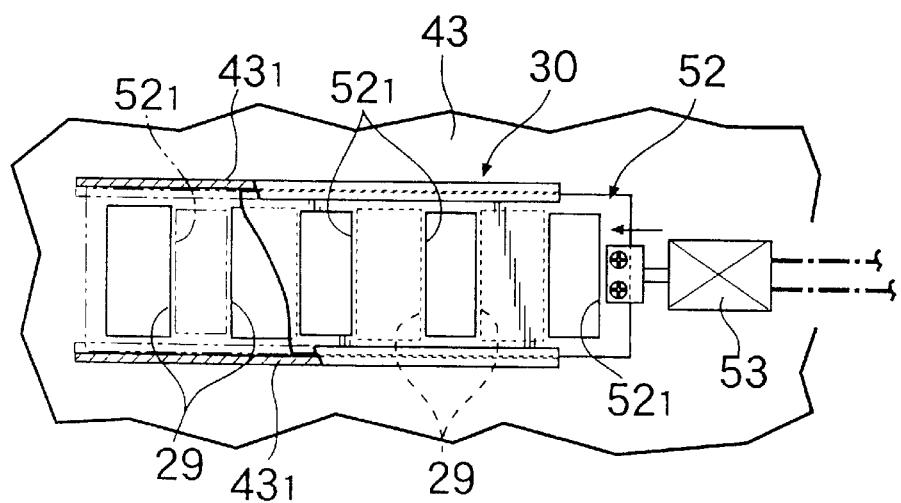
FIG. 16 is a section view taken along the line 16—16 of FIG. 15.
Figure 17:
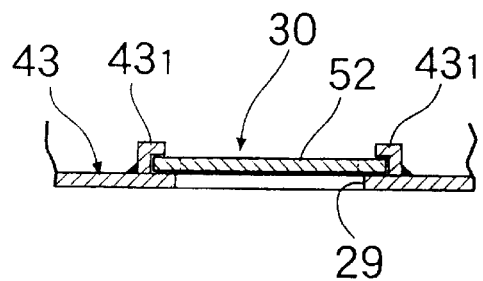
FIG. 17 is a section view taken along the line 17—17 of FIG. 15.
Figure 18:
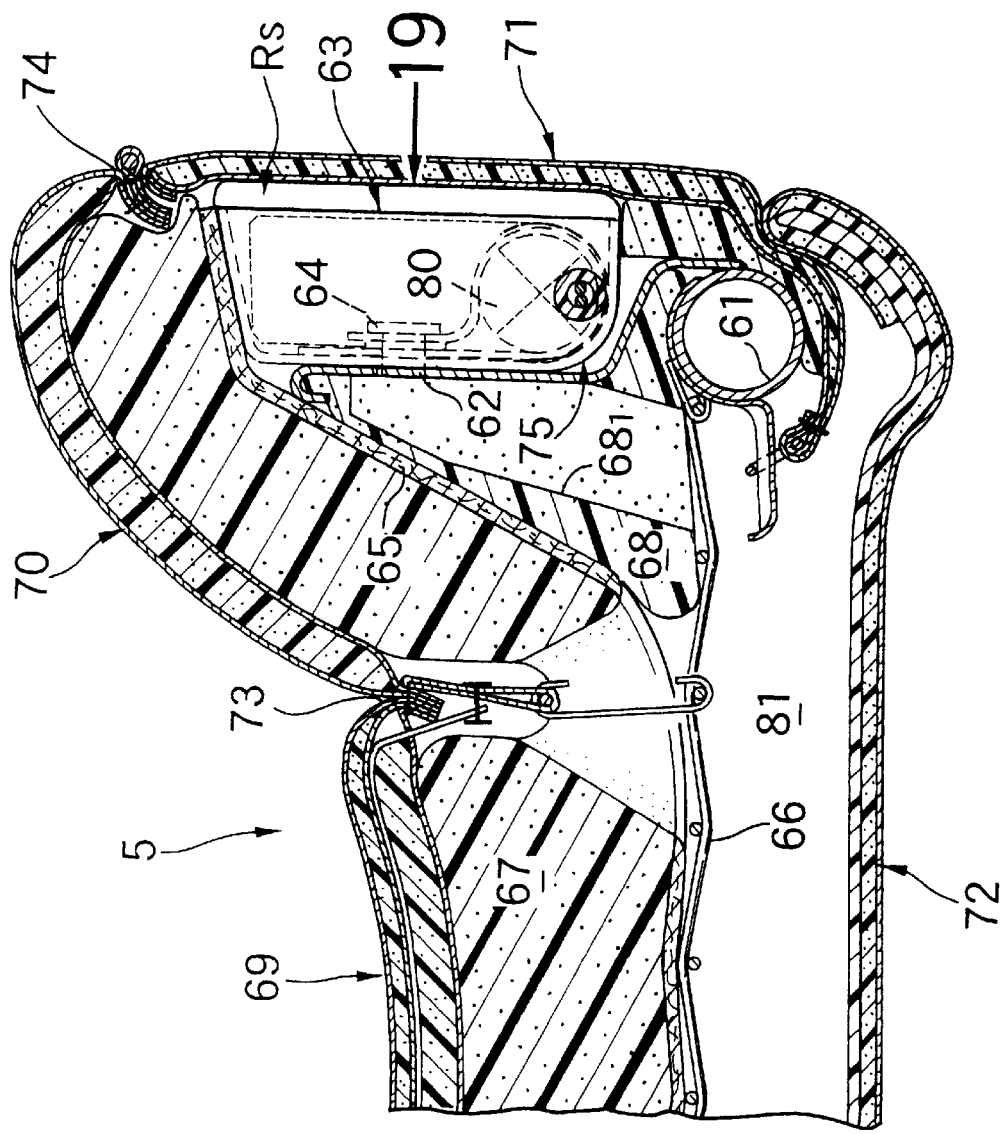
FIG. 18 is an enlarged section view taken along the line 18—18 of FIG. 1.
Figure 19:
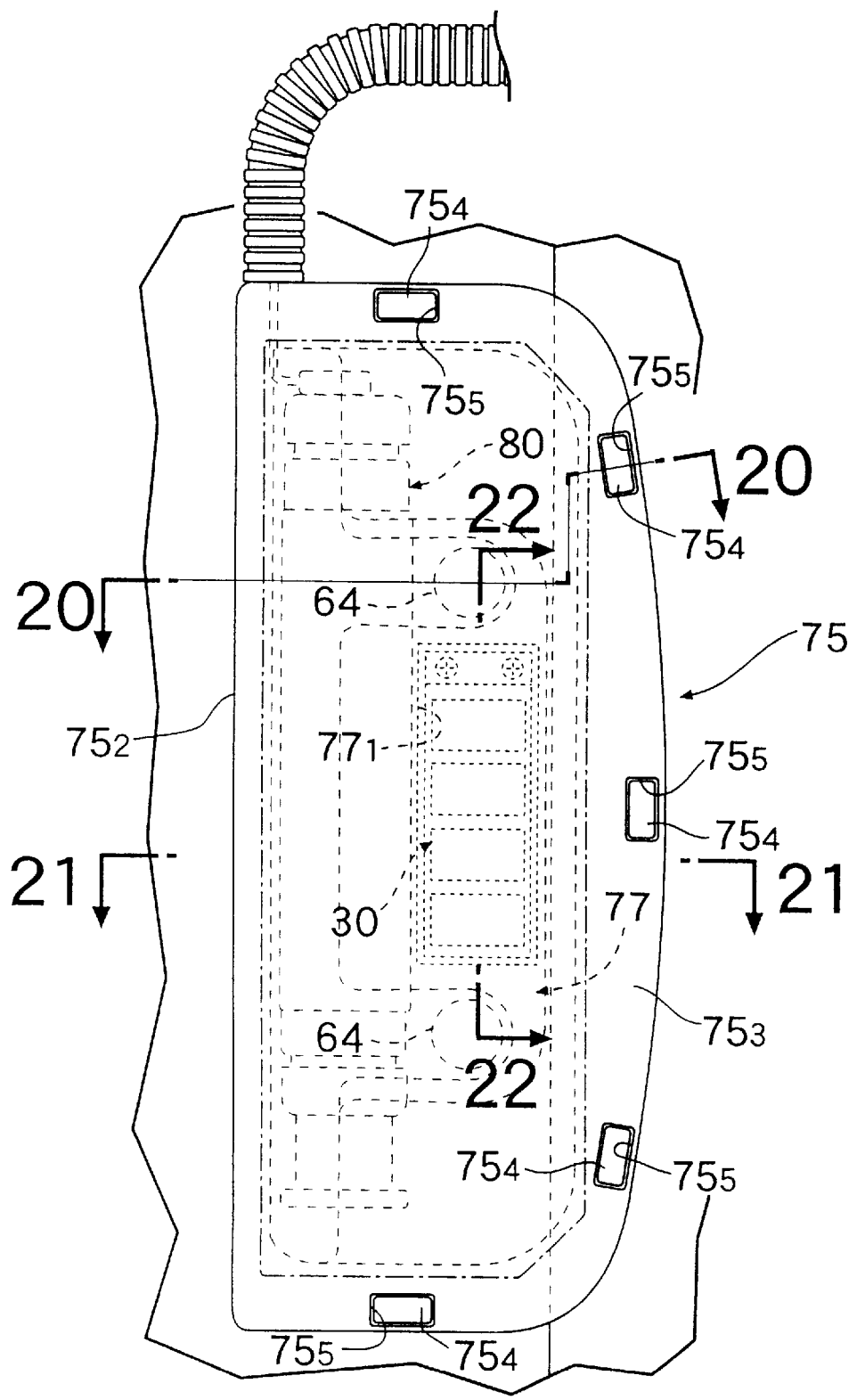
FIG. 19 is a view looking in the direction 19 of FIG. 18.
Figure 20:
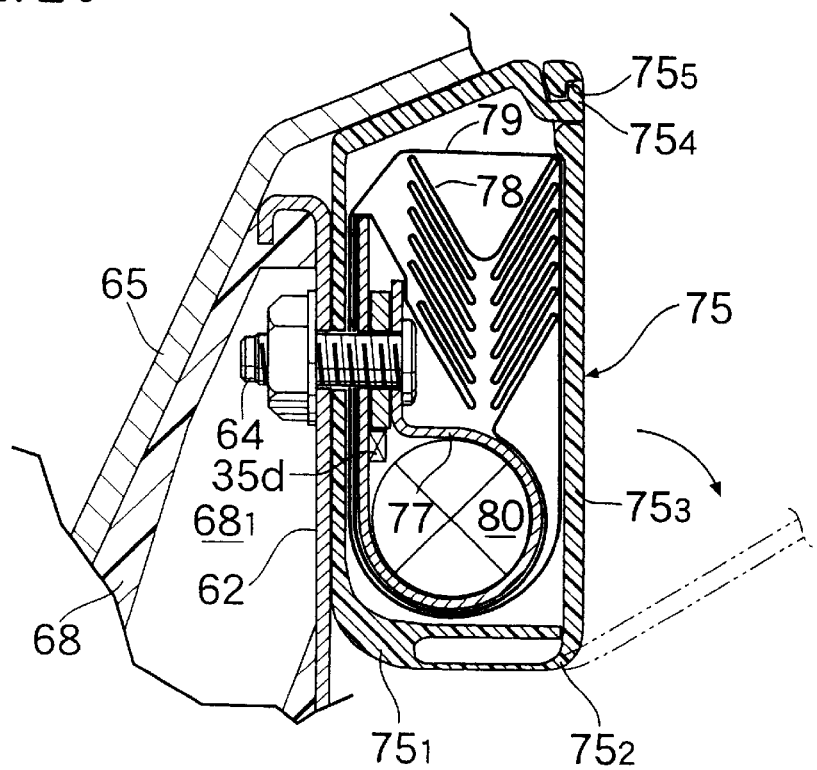
FIG. 20 is a section view taken along the line 20—20 of FIG. 19.
Figure 21:
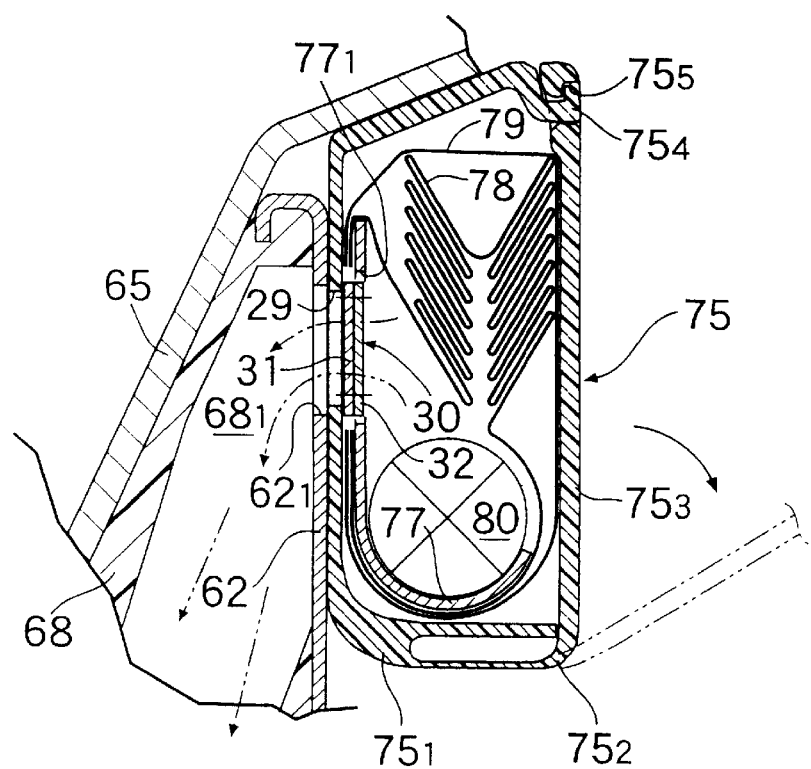
FIG. 21 is a section view taken along the line 21—21 of FIG. 19.
Figure 22:
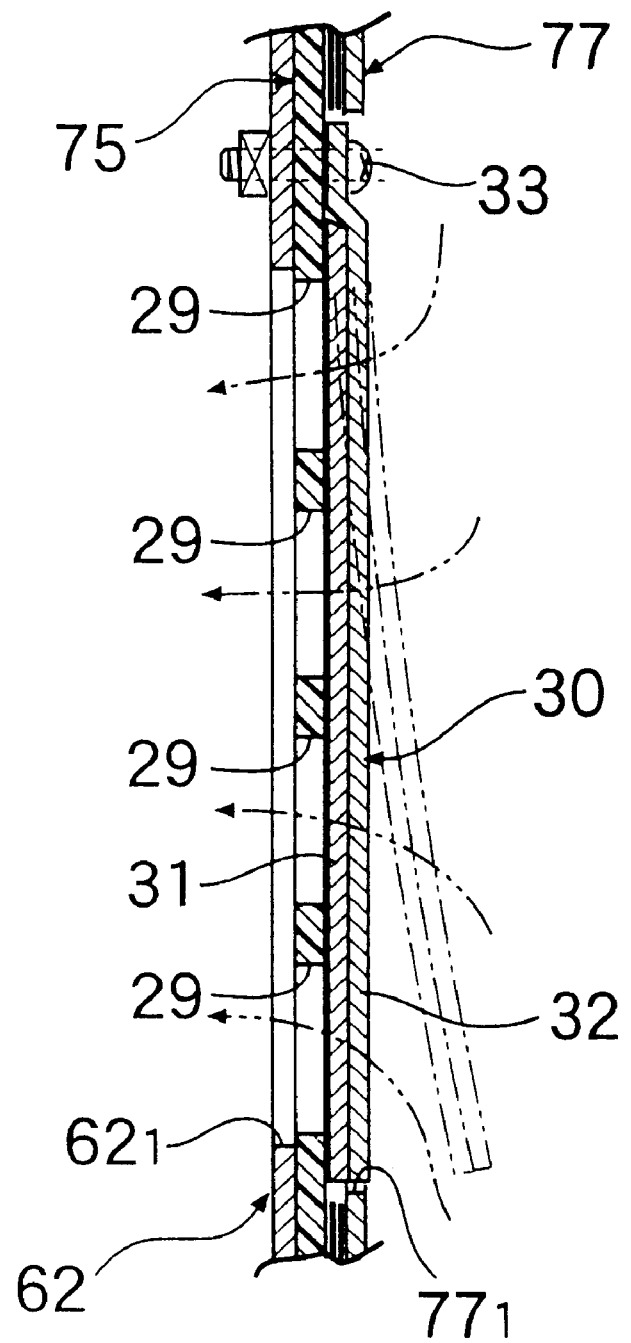
FIG. 22 is a section view taken along the line 22—22 of FIG. 19.
Figure 23:
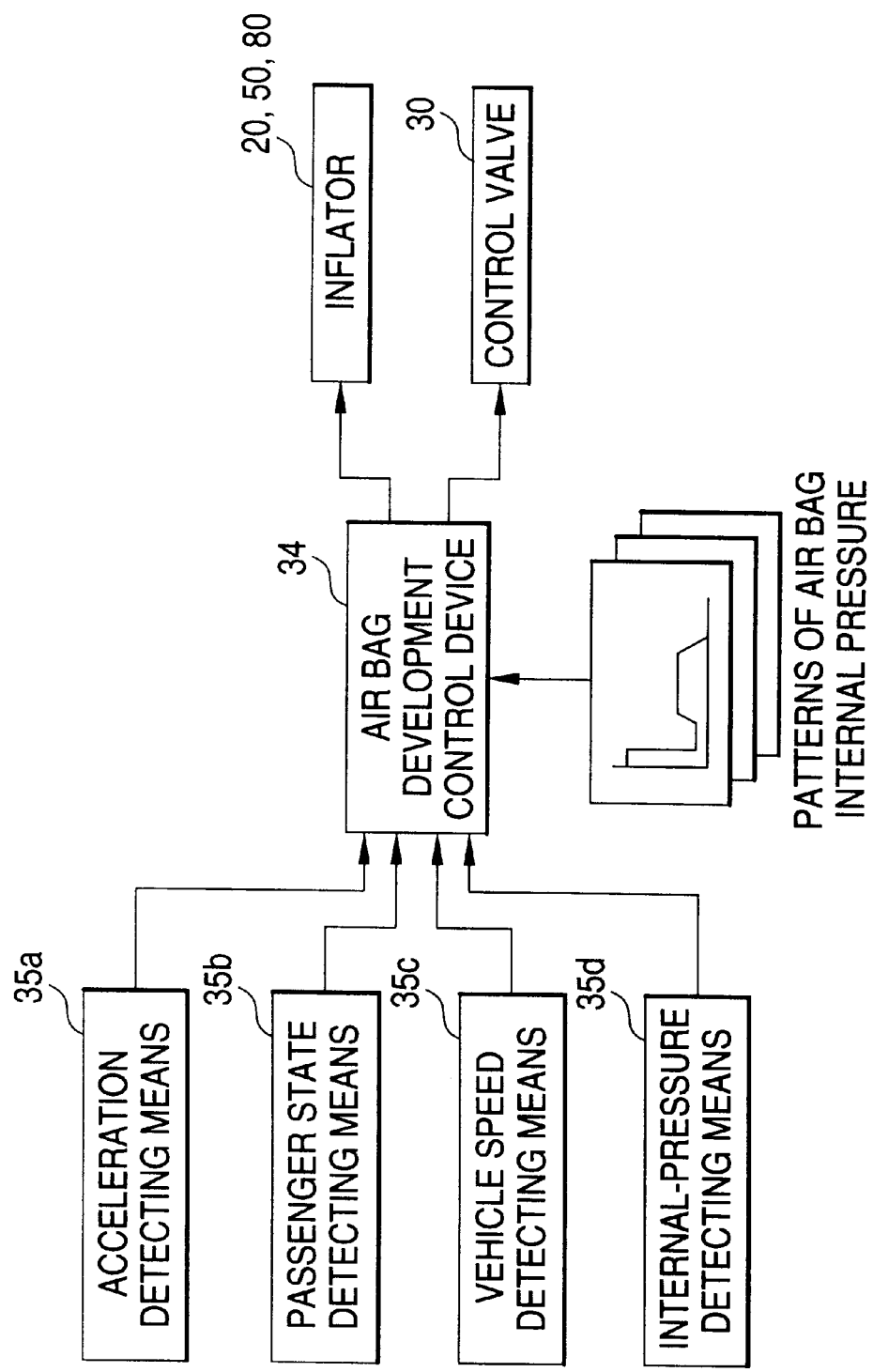
FIG. 23 is a block diagram showing an example of a system for controlling the opening degree of vent holes.
Figure 24:
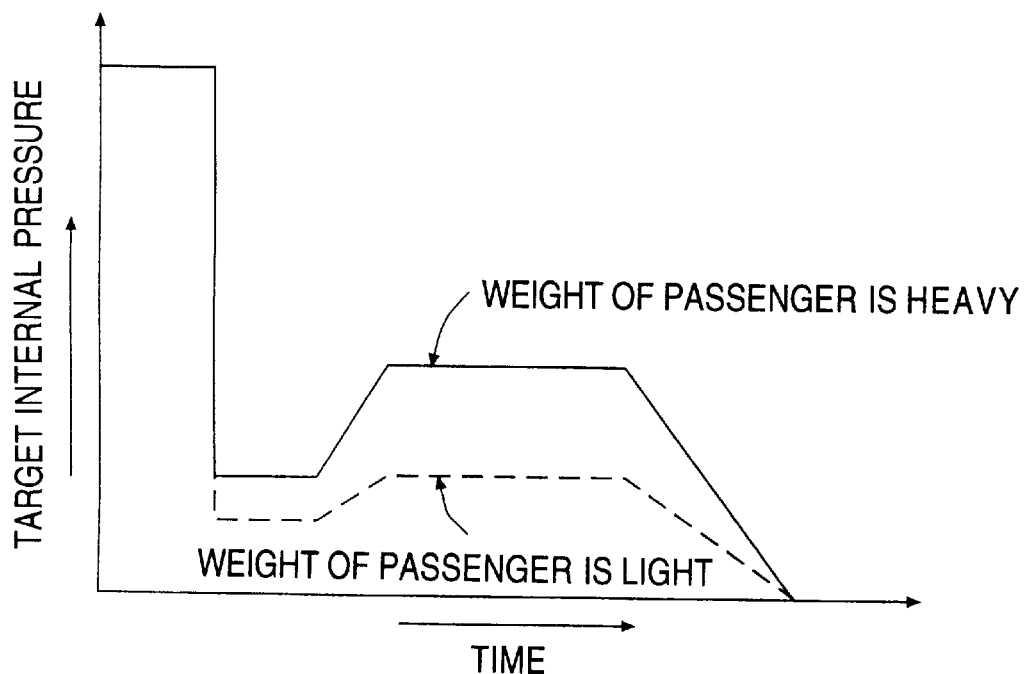
FIG. 24 is a diagram showing an example of a change of a target internal-pressure pattern with respect to the state of a passenger.
Figure 25:
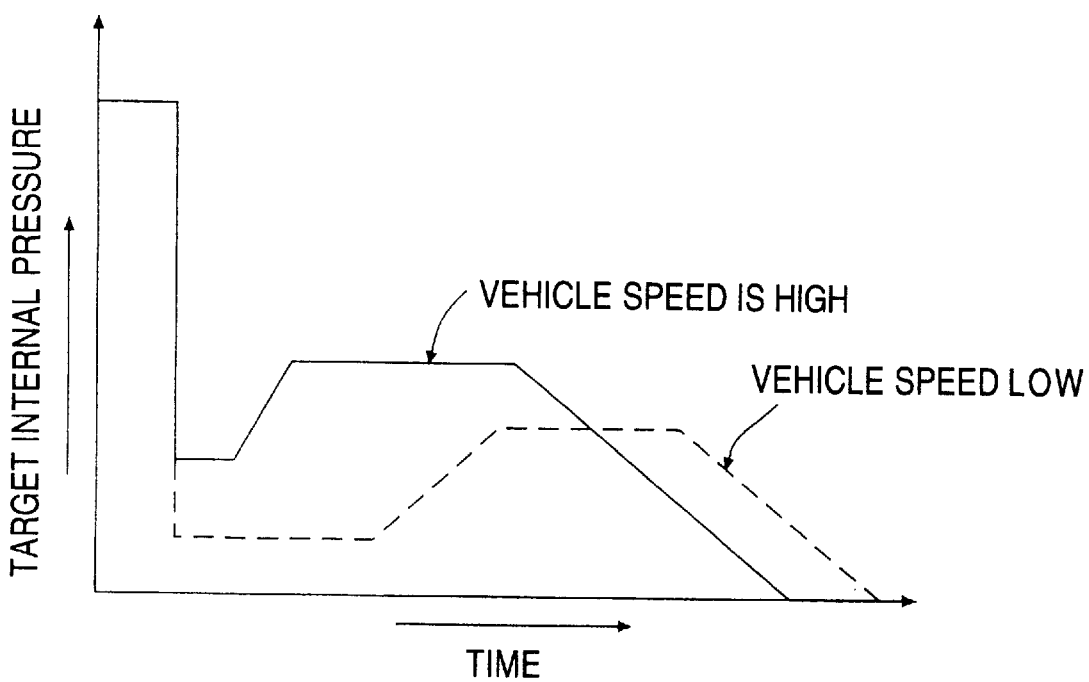
FIG. 25 is a diagram showing an example of a change of a target internal-pressure pattern with respect to on the speed of a vehicle.
Figure 26:
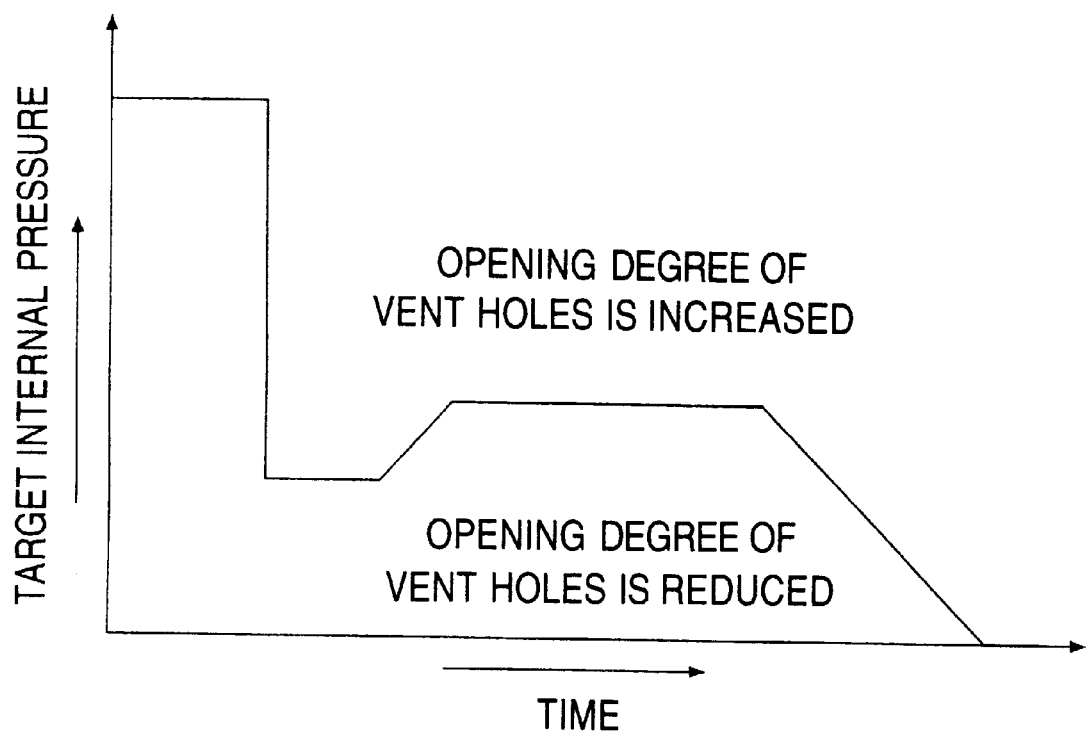
FIG. 26 is a diagram illustrating a feedback control of the opening degree of vent holes.

FIGS. 1 to 26 show an embodiment of the invention. FIG. 1 is a perspective view of a front portion of a cabin of a vehicle; FIG. 2 is an enlarged section view taken along the line 2—2 of FIG. 1; FIG. 3 is a section view taken along the line 3—3 of FIG. 2; FIG. 4 is an enlarged section view taken along the line 4—4 of FIG. 3; FIG. 5 is an exploded perspective view of an air bag device for a driver's seat; FIG. 6A is a view showing a modification of the air bag device for a driver's seat and corresponding to FIG. 3; FIG. 6B is an exploded perspective view of the modification of the air bag device for a driver's seat shown in FIG. 6A; FIG. 7 is an enlarged section view taken along the line 7—7 of FIG. 6A; FIG. 8 is an enlarged section view taken along the line 8—8 of FIG. 1; FIG. 9 is a section view taken along the line 9—9 of FIG. 8; FIG. 10 is a view looking in the direction of the line 10—10 of FIG. 9; FIG. 11 is an exploded perspective view of an air bag device for a passenger's seat; FIG. 12 is a view showing a first modification of the air bag device for a passenger's seat and corresponding to FIG. 9; FIG. 13 is a section view taken along the line 13—13 of FIG. 12; FIG. 14A is a section view taken along the line 14—14 of FIG. 12; FIG. 14B is an exploded perspective view of the first modification of the air bag device for a passenger's seat shown in FIGS. 12 to 14A; FIG. 15 is a view showing a second modification of the air bag device for a passenger's seat and corresponding to FIG. 9; FIG. 16 is a section view taken along the line 16—16 of FIG. 15; FIG. 17 is a section view taken along the line 17—17 of FIG. 15; FIG. 18 is an enlarged section view taken along the line 18—18 of FIG. 1; FIG. 19 is a view looking in the direction 19 of FIG. 18; FIG. 20 is a section view taken along the line 20—20 of FIG. 19; FIG. 21 is a section view taken along the line 21—21 of FIG. 19; FIG. 22 is a section view taken along the line 22—22 of FIG. 19; FIG. 23 is a block diagram showing an example of a system for controlling the opening degree of vent holes; FIG. 24 is a diagram showing an example of a change of a target internal-pressure pattern with respect to the state of a passenger; FIG. 25 is a diagram showing an example of a change of a target internal-pressure pattern with respect to the speed of a vehicle; and FIG. 26 is a diagram illustrating a feedback control of the opening degree of vent holes.

As shown in FIG. 1, a driver-seat air bag device Rd is disposed in a center portion of a steering wheel 2 which is placed in front of a driver's seat 1. A passenger-seat air bag device Rp is disposed in an upper portion of a dashboard 4 which is placed in front of a passenger's seat 3. Side air bag devices Rs, which is mainly used for preventing a head of the occupant (that is, the driver or the passenger) from contacting a door window, a window frame of door or a pillar of the vehicle, are disposed inside seat backs 5 of the driver's and passenger's seats 1 and 3, respectively.

Next, the structure of the driver-seat air bag device Rd will be described with reference to FIGS. 2 to 5.

The steering wheel 2 comprises a steering boss 13, an annular wheel rim 14, a front cover 15, a rear cover 16 and plural spokes 17. The steering boss 13 is fitted onto the rear end of a steering shaft 11 so as not to be relatively rotatable, and is fixed thereto by a nut 12. The annular wheel rim 14 is disposed so as to surround the steering boss 13. The front cover 15 is fixed to the steering boss 13. The rear cover 16 is coupled to the front cover 15. The front cover 15 is connected to the wheel rim 14 through the plural spokes 17. An air bag module 18 is housed in a space defined by the front cover 15 and the rear cover 16.

The air bag module 18 is constructed by a retainer 19, an inflator 20 and an air bag 21. The retainer 19 supports the module onto the inner face of the rear cover 16. The inflator 20 generates a high pressure gas. The air bag 21 is inflated by the high pressure gas generated by the inflator 20.

A mount flange $19_1$ which is formed integrally with the outer periphery of the retainer 19 is fixed by plural rivets 22 to a mount flange $16_1$ which is formed integrally with the inner periphery of the rear cover 16. The periphery of an opening of the air bag 21 and an ring-like holder 23 are stacked with each other and fastened together to the retainer 19 by plural bolts 24. The inflator 20 which is filled with a granular gas generating agent 25 is housed in the air bag 21 and fixed to the retainer 19 by plural bolts 26. An igniting agent 27 is placed in the inflator 20. The tip end of an ignitor 28 which elongates in the inflator 20 faces the igniting agent 27.

As clearly shown in FIG. 5, four vent holes 29 are formed in series in the retainer 19 which faces the interior of the air bag 21. A control valve 30 which controls the opening degree of the vent holes 29 is configured by bonding a piezoelectric element 31 which is formed into a rectangular shape, to a protector 32 which is formed by a metal plate and has substantially the same shape. One end portion of the valve is fixed to the retainer 19 by bolts 33 so that one face covers the vent holes 29. The piezoelectric element 31 which is fragile and easily broken is reinforced by being bonded to the protector 32. The piezoelectric element 31 can constitute an actuator.

As shown in FIG. 23, to an air bag development control device 34 which constitutes an example of the controlling means in the present invention, connected are acceleration detecting means 35$a$ for detecting the acceleration during a collision of the vehicle, occupant state detecting means 35$b$ for detecting a state of the occupant such as the weight, the body dimensions, or the sitting posture of the occupant, vehicle speed detecting means 35$c$ for detecting the speed of the vehicle, and internal-pressure. detecting means 35$d$ for detecting the internal pressure of the air bag 21. The occupant state detecting means 35$b$ is configured by means, disposed in a seat cushion, for detecting the weight of the occupant, thereby discriminating between an adult and a child, or means for detecting the sitting height of the occupant by using infrared rays, thereby discriminating between an adult and a child. The internal-pressure detecting means 35$d$ is configured by a usual pressure sensor and disposed in the retainer 19 so that a detection unit of the means faces the internal space of the air bag 21.

As shown in FIG. 2, when an acceleration which is greater than a preset value is detected during a vehicle collision, the air bag development control device 34 supplies a current to the ignitor 28 to ignite the inflator 20. The air bag 21 is inflated by a gas generated by the inflator 20 and breaks the rear cover 16 along a tear line $16_2$ which is thin and formed into an H-like shape in the rear cover, with the result that the air bag develops into the cabin.

At this time, the air bag development control device 34 controls the energization of the piezoelectric element 31 of the control valve 30 on the basis of a signal from the occupant state detecting means 35$b$ or the vehicle speed detecting means 35$c$, so that the opening degree of the vent holes 29 is changed. Specifically, when the piezoelectric element 31 is not energized, the control valve 30 linearly extends as shown in FIG. 4A to close the vent holes 29, and, when the piezoelectric element 31 is energized, the control valve 30 bends as shown in FIG. 4B in accordance with the degree of the energization, to open the vent holes 29. In this way, the opening degree of the vent holes 29 can be controlled accurately and steplessly by the very simple structure in which the plate-like piezoelectric element 31 covering the vent holes 29 is energized to bend.

Plural internal-pressure patterns for the air bag 21, i.e., changes of the internal pressure of the air bag 21 with respect to the elapse of time are previously stored in the form of a map. The air bag development control device 34 selects a predetermined one of the plural internal-pressure patterns, and then controls the control valve 30. In order to make the actual internal pressure of the air bag coincident with the one of the internal-pressure patterns stored in the map, a feedback control is conducted on the basis of the air bag internal pressure detected by the internal-pressure detecting means 35$d$. The contents of the control of the opening degree of the control valve 30 will be specifically described later in detail.

FIGS. 6A, 6B, and 7 shows a modification of the driver-seat air bag device Rd. The control valve 30 has a structure which is different from that described with reference to FIGS. 2 to 5.

The control valve 30 of the modification opens and closes the vent holes 29 which are annularly arranged in the retainer 19, and is configured by a disk-like valve plate 36 having openings $36_1$ that are identical in shape and number with the vent holes 29, and an ultrasonic motor 37 which rotates the valve plate 36. When the valve plate 36 is located at the position shown in FIG. 7A, the vent holes 29 are closed by the valve plate 36, and, when the valve plate 36 is located at the position shown in FIG. 7B, the vent holes 29 are opened through the openings $36_1$ of the valve plate 36.

In this way, the opening degree of the plural vent holes 29 which are annularly arranged is controlled by rotating the valve plate 36 having the plural openings $36_1$ by the motor 37 in accordance with the air bag development control device. Therefore, the opening degree of the vent holes 29 can be changed from a fully closed state to a fully opened state or vice versa, only by rotating the valve plate 36 with a small angle corresponding to the central angle of one of the vent holes 29. As a result, miniaturization of the motor 37 and improvement of the responsibility can be simultaneously attained.

Next, the structure of the passenger-seat air bag device Rp will be described with reference to FIGS. 8 to 11.

A retainer 43 of an air bag module 42 is fixed to support portions $41_1$ which downward elongate from a lid 41. The lid is fixed to an opening 41 which is formed in the upper face of the dashboard 4. The retainer 43 is configured by an upper retainer 45 and a lower retainer 46 which are fixed to each other by plural bolts 44. The upper retainer 45 is fixed to the support portions $41_1$ of the lid 41 by plural bolts 47. The periphery of the opening of the air bag 48, and the coupling portions of the upper and lower retainers 45 and 46 are fastened together by the bolts 47. A tear line $41_2$ which is made thin so as to be broken when the air bag 48 is inflated is formed in the lid 41. A cylindrical inflator 50 is supported on a bottom portion of the lower retainer 46 via a pair of mount brackets 49. A control valve 30 having the same structure as that of the driver-seat air bag device Rd is attached in order to open and close the vent holes 29 formed in the bottom portion of the lower retainer 46. The internal pressure of the air bag 48 is detected by the internal-pressure detecting means 35d.

The current supplies to the inflator 50 and the control valve 30 are controlled by the air bag development control device 34 to which signals of the acceleration detecting means 35a, the occupant state detecting means 35b, the vehicle speed detecting means 35c, and the internal-pressure detecting means 35d are supplied. When the acceleration detecting means 35a detects an acceleration greater than a preset value during a vehicle collision, the inflator 50 is ignited in response to instructions from the air bag development control device 34, to generate a high pressure gas. The air bag 48 which is inflated by the pressure of the gas breaks the tear line $41_2$ of the lid 41 and then develops into the cabin. At this time, the opening degree of the control valve 30 is feedback-controlled by the signals from the occupant state detecting means 35b, the vehicle speed detecting means 35c, and the internal-pressure detecting means 35d.

FIGS. 12 to 14B show a first modification of the passenger-seat air bag device Rp. The control valve 30 has a structure which is different from that described with reference to FIGS. 8 to 11.

The control valve 30 of the modification comprises a valve plate 51 which is rotatably supported on the outer periphery of the inflator 50 and which has an arcuate section shape, and a motor 37 serving as an actuator which rotates the valve plate 51. When the valve plate 51 is rotated to slide along the inner face of the retainer 43, two slit-like vent holes 29 formed in the retainer 43 are opened or closed by the valve plate 51 having two slit-like openings 511 which correspond to the vent holes.

In this way, the opening degree of the plural vent holes 29 is controlled by rotating the valve plate 51 having the plural slit-like openings $51_1$ by the motor 37. Therefore, the opening degree of the vent holes 29 can be changed from a fully closed state to a fully opened state or vice versa, only by rotating the valve plate 51 with a small angle corresponding to the central angle of one of the vent holes 29. As a result, the responsibility can be improved.

FIGS. 15 to 17 show a second modification of the passenger-seat air bag device Rp. The control valve 30 has a structure which is different from that described with reference to FIGS. 8 to 11.

The control valve 30 of the modification comprises a valve plate 52 which is slidably supported on a pair of guide rails $43_1$ disposed on the bottom face of the retainer 43, and a linear solenoid 53 serving as an actuator which reciprocally moves the valve plate 52 along the guide rails $43_1$. In the valve plate 52, openings $52_1$ are formed that are identical in shape and number with the four vent holes 29 which are arranged along a single line. When the valve plate 52 is moved by the linear solenoid 53 and the openings $52_1$ overlap the vent holes 29, the vent holes 29 are opened.

In this way, the opening degree of the plural vent holes 29 which are arranged along a single line is controlled by reciprocally moving the valve plate 52 having the plural openings $52_1$ by the linear solenoid 53. Therefore, the opening degree of the vent holes 29 can be changed from a fully closed state to a fully opened state or vice versa, only by moving the valve plate 52 with a distance corresponding to the length of one of the vent holes 29. As a result, the responsibility can be improved. In place of the linear solenoid 53, an actuator in which a number of piezoelectric elements are stacked one another may be used.

Next, the structure of the side air bag device Rs will be described with reference to FIGS. 18 to 22.

Within a right side occupant seat, a pipe frame 61 vertically elongates along the right side edge of the seat back 5. A mount bracket 62, which elongates toward the front of the vehicle body and which is made of a metal, is fixed by welding to the pipe frame 61. An air bag module 63 is fixed to the right side face of the mount bracket 62 by bolts 64. A shape retaining member 65 made of a rough blanket extends from the front face of the air bag module 63 toward the left side of the vehicle body. The shape retaining member 65 is extended through an intermediate portion of the seat back 5 in the thickness direction thereof, and is connected to a pipe flame (not shown) which vertically elongates along the left side edge of the seat back 5. A mesh-like spring 66 is disposed and stretched between these right side and left side pipe frames. A pad 68 made of sponge is provided in a portion surrounded by the front face of the mesh-like spring 66, the rear face of the shape retaining member 65, and the rear face of the mount bracket 62. Similarly, a pad 67 made of sponge is provided on the front face of the retaining member 65.

The center portion of the front face of the seat back 5 is covered with a first covering member 69. The lateral side portions and upper portion of the first covering member 69 are covered with a second covering member 70. The lateral side faces and upper face of the seat back 5 which are continuous to the second covering member 70 are covered with a third covering member 71. The rear face of the seat back 5 is covered with a fourth covering member 72. The first and second covering members 69 and 70 are stitched together in a stitched portion 73, and the second and third covering members 70 and 71 are stitched together in a stitched portion 74.

The air bag module 63 comprises a retainer 75 which is integrally formed by a synthetic resin, and a holder 77 which is supported inside the retainer. The retainer 75 and the holder 77 are fastened together to the mount bracket 62 by the bolts 64. The retainer 75 comprises: a tray-like body portion $75_1$ which opens toward the right side of the vehicle body; and a lid portion $75_3$ which is connected to the rear edge of the body portion $75_1$ via a hinge portion $75_2$. Five engaging pawls $75_4$ which are formed on the upper, front, and lower edges of the body portion $75_1$ are engaged with five engaging holes $75_5$ which are formed on the upper, front, and lower edges of the lid portion $75_3$, respectively, whereby the lid portion $75_3$ is fixed so as to cover the opening of the body portion $75_1$.

A folded air bag 78 is enveloped in a protect cover 79. The peripheral edge of the opening of the air bag 78, and both the ends of the protect cover 79 are sandwiched between and fixed to the retainer 75 and the holder 77, so that an inflator 80 fixed to the holder 77 is housed in the air bag 78. When the air bag 78 is inflated, the protect cover 79 is easily torn out, and hence does not impede the inflation.

The interior of the air bag 78 communicates with the exterior of the seat back 5 via: an opening $77_1$ formed in the holder 77; four vent holes 29 formed in the body portion $75_1$ of the retainer 75; an opening $62_1$ formed in the mount bracket 62; a gas passage 68₁ formed in the pad 68; and a space 81 formed on the side of the rear face of the seat back 5. In order to control the opening degree of the four vent holes 29, the control valve 30 having the same structure of the control valves of the driver-seat air bag device Rd and the passenger-seat air bag device Rp is attached to the inside of the retainer 75.

The current supplies to the inflator 80 and the control valve 30 are controlled by the air bag development control device 34 to which signals of the acceleration detecting means 35a, the occupant state detecting means 35b, the vehicle speed detecting means 35c, and the internal-pressure detecting means 35d are supplied. When the inflator 80 generates a gas during a vehicle collision, the air bag 78 is inflated in the retainer 75. When the pressure due to the inflation of the air bag 78 acts on the lid portion 75₃ of the retainer 75, the engaging pawls 75₄ are disengaged from the engaging holes 75₅ and the lid portion 75₃ is rotated about the hinge portion 75₂, whereby the body portion 75₁ is opened. The pressure by which the lid portion 75₃ is opened is transmitted to the third covering member 71 of the seat back 5. Then, the stitched portion 74 is broken and the second and third covering members 70 and 71 are separated from each other. The air bag 78 passes through a gap formed as result of the separation and then forward develops so as to expand along the inner face of a front door.

Next, the contents of an example of the control of the opening and closing of the vent holes 29 of the driver-seat air bag device Rd, the passenger-seat air bag device Rp, and the side air bag device Rs will be specifically described with reference to FIGS. 24 and 26.

In FIG. 24, the abscissa indicates the time elapsed after ignition of the inflator 20, 50, or 80, and the ordinate indicates a target value of the internal pressure of the air bag 21, 48, or 78. Immediately after the inflator 20, 50, or 80 is ignited, during a period until the tear line 16₂ (see FIG. 5) of the rear cover 16 is broken in the driver-seat air bag device Rd, that until the tear line 41₂ (see FIG. 11) of the lid 41 is broken in the passenger-seat air bag device Rp, or that until the stitched portion 74 (see FIG. 18) is broken in the side air bag device Rs, inflation of the air bag 21, 48, or 78 is suppressed and the internal pressure of the air bag is abruptly increased. When the rear cover 16, the lid 41, or the stitched portion 74 is then broken, the air bag 21, 48, or 78 jumps into the cabin, and the capacity of the air bag 21, 48, or 78 is increased by the inertia, so that the internal pressure of the air bag is abruptly lowered. Thereafter, the air bag 21, 48, or 78 is further inflated to develop by the gas generated by the inflator 20, 50, or 80, thereby restraining an occupant.

The target internal-pressure pattern of the air bag 21, 48, or 78 in this case, particularly the maximum value of the air bag internal pressure at the timing when the occupant is restrained by the air bag 21, 48, or 78 is changed in accordance with the body dimensions of the occupant detected by the occupant state detecting means 35b. When the occupant is an adult having a heavy weight, the opening degree of the vent holes 29 is reduced so as to increase the internal pressure of the air bag 21, 48, or 78 as indicated by the solid line, and, when the occupant is a child having a light weight, the opening degree of the vent holes 29 is increased so as to reduce the internal pressure of the air bag 21, 48, or 78 as indicated by the broken line, thereby generating a restraining force which is optimum to the body dimensions of the occupant.

The target internal-pressure pattern of the air bag 21, 48, or 78 is changed in accordance with the vehicle speed detected by the vehicle speed detecting means 35c. When the vehicle speed at a collision is low, the timing when the occupant is restrained by the air bag 21, 48, or 78 is delayed, and the required restraining force is reduced. As compared with the target internal-pressure pattern at a high-speed collision and indicated by the solid line, therefore, the target internal-pressure pattern at a low-speed collision and indicated by the broken line is set so that the timing when the maximum value of the internal pressure is generated is delayed and the maximum value of the internal pressure is reduced as shown in FIG. 25.

When an adequate target internal-pressure pattern is selected in accordance with the state of the occupant and the vehicle speed as described above, the actual air bag internal pressure detected by the internal-pressure detecting means 35d is compared with the target internal pressure. If the actual air bag internal pressure is not lower than the target internal pressure, the opening degree of the vent holes 29 is increased as shown in FIG. 26, and, if the actual air bag internal pressure is lower than the target internal pressure, the opening degree of the vent holes 29 is reduced, whereby a feedback control is conducted so as to make the actual air bag internal pressure coincident with the target internal pressure.

The opening degree A(t) in the feedback control is determined as a function of the time t by following expression (1) in Example 1, or expressions (2) and (3) in Example 2. In the expressions, R(t) is the target internal pressure, P(t) is the actual internal pressure, and $C_1(t)$ to $C_4(t)$ are correction coefficients.

Example 1

$$A(t)=[\{C_1(t)-C_2(t)\}R(t)+C_2(t)P(t)]/R(t) \qquad (1)$$

Example 2

When $P(t) \geq R(t)$, $$A(t)=C_3(t)\{P(t)-R(t)\} \qquad (2)$$

When $P(t) < R(t)$, $$A(t)=C_4(t)\{R(t)-P(t)\} \qquad (3)$$

In the embodiment, a pressure sensor which is commercially available is used as the internal-pressure detecting means 35d. Alternatively, the internal-pressure detecting means 35d may be configured in the following manner.

Figure 27:
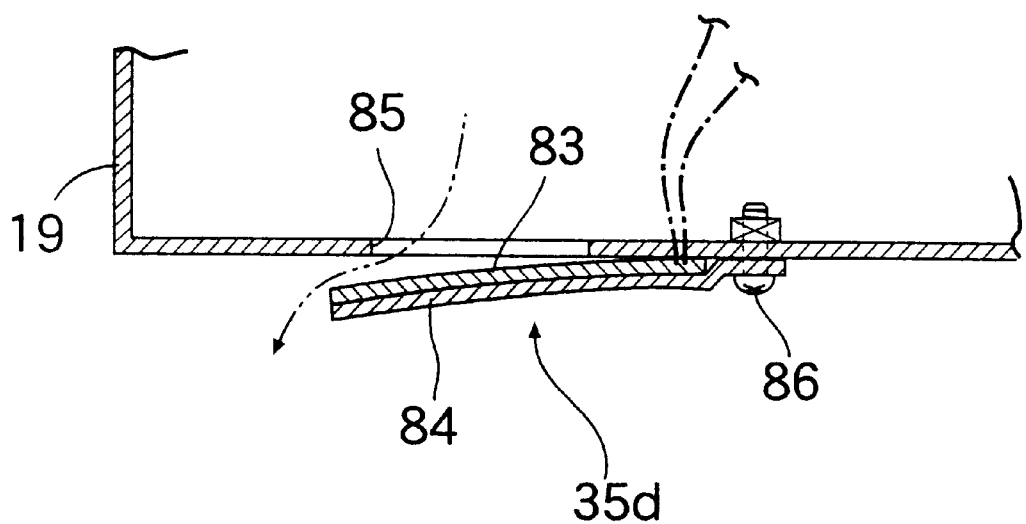
FIG. 27 is a view showing a second embodiment of internal-pressure detecting means.

In an embodiment shown in FIG. 27, the internal-pressure detecting means 35d which is configured by bonding a piezoelectric element 83 to a metal protector 84 is fixed by a bolt 86 so as to outwardly cover an opening 85 formed in the retainer 19. As the air bag internal pressure is raised and the amount of the gas discharged through the opening 85 is increased, the piezoelectric element 83 of the internal-pressure detecting means 35d is outwardly deformed, and a potential difference corresponding to the degree of the deformation is generated. Therefore, the air bag internal pressure can be detected by monitoring the potential difference.

Figure 28:
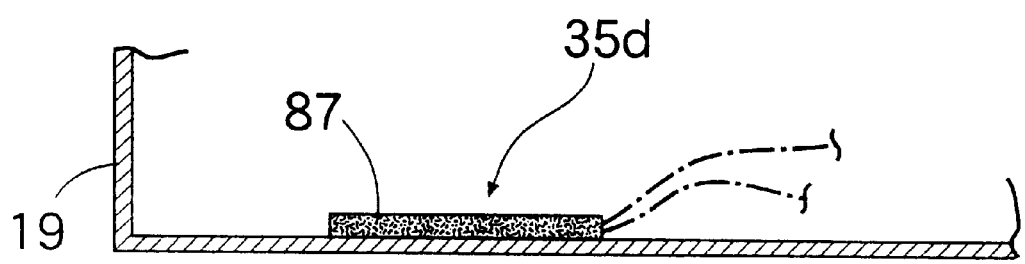
FIG. 28 is a view showing a third embodiment of the internal-pressure detecting means.

In an embodiment shown in FIG. 28, a strain gauge 87 is attached to the inner wall face of the retainer 19. When the retainer 19 is deformed in accordance with a change of the air bag internal pressure, the resistance of the strain gauge 87 is changed. Based on this phenomenon, the air bag internal pressure can be detected.

Hereinafter, another example of the controlling means in the present invention will be described with reference to FIGS. 4A, 4B, 8 to 11, and 29 to 32.

Figure 29:
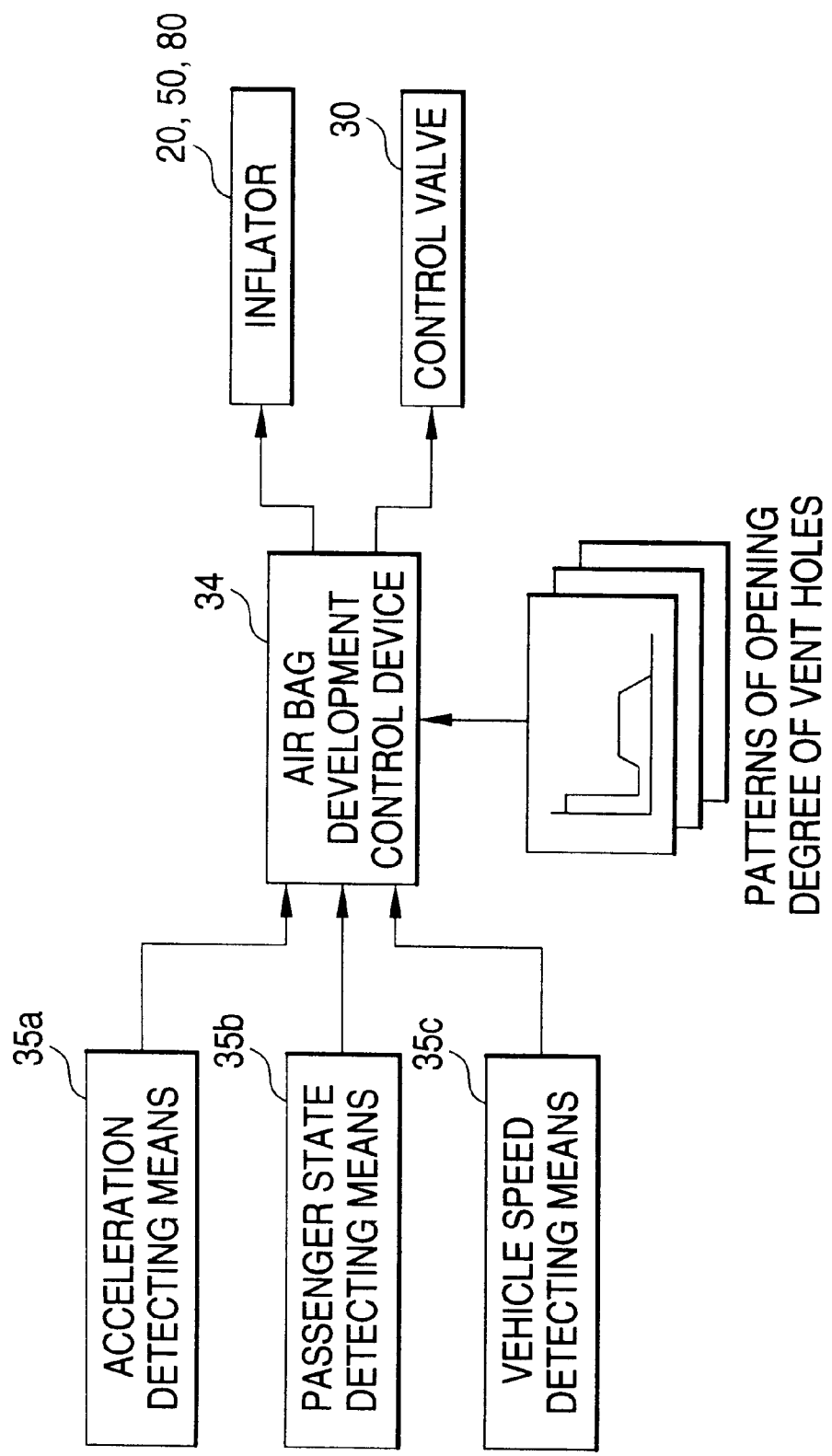
FIG. 29 is a block diagram showing another example of the system for controlling the opening degree of vent holes.

As shown in FIG. 29, to an air bag development control device 134 which constitutes the other example of the controlling means in the present invention, connected are acceleration detecting means 35a for detecting the acceleration during a collision of the vehicle, occupant state detecting means 35b for detecting a state of the occupant such as the weight, the body dimensions, or the sitting posture of the occupant, and vehicle speed detecting means 35c for detecting the speed of the vehicle. The occupant state detecting means 35b is configured by means, disposed in a seat cushion, for detecting the weight of the occupant, thereby discriminating between an adult and a child, or means for detecting the sitting height of the occupant by means of infrared rays, thereby discriminating between an adult and a child.

When an acceleration which is greater than a preset value is detected during a vehicle collision, the air bag development control device 134 supplies a current to the ignitor 28 to ignite the inflator 20. The air bag 21 is inflated by a gas generated by the inflator 20 and breaks the rear cover 16 along the tear line $16_2$ which is thin and formed into an H-like shape in the rear cover, with the result that the air bag develops into the cabin. At this time, the air bag development control device 134 controls the energization of the piezoelectric element 31 of the control valve 30 on the basis of a signal from the occupant state detecting means 35b or the vehicle speed detecting means 35c, so that the opening degree of the vent holes 29 is changed. Specifically, when the piezoelectric element 31 is not energized, the control valve 30 linearly extends as shown in FIG. 4A to close the vent holes 29, and, when the piezoelectric element 31 is energized, the control valve 30 bends as shown in FIG. 4B in accordance with the degree of the energization, to open the vent holes 29. In this way, the opening degree of the vent holes 29 can be controlled accurately and steplessly by the very simple structure in which the plate-like piezoelectric element 31 covering the vent holes 29 is energized to bend.

Plural patterns of the opening degree of the vent holes 29, i.e., changes of the opening degree of the vent holes 29 with respect to the elapse of time are previously stored in the form of a map. The air bag development control device 134 selects a predetermined one of the plural internal-pressure patterns, and then controls the control valve 30. The contents of the control of the opening degree of the control valve 30 will be specifically described later in detail.

In the embodiment, energization of the piezoelectric element 31 of the control valve 30 is controlled. It is a matter of course that, in place of the control, the controls of the other embodiments such as that the valve plate 36 is rotated by the motor 37 may be employed.

The current supplies to the inflator 50 and the control valve 30 are controlled by the air bag development control device 134 to which signals of the acceleration detecting means 35a, the occupant state detecting means 35b, and the vehicle speed detecting means 35c are supplied. When the acceleration detecting means 35a detects an acceleration greater than a preset value during a vehicle collision, the inflator 50 is ignited in response to instructions from the air bag development control device 134, to generate a high pressure gas. The air bag 48 which is inflated by the pressure of the gas breaks the tear line $41_2$ of the lid 41 and then develops into the cabin. At this time, the opening degree of the control valve 30 is controlled by signals from the occupant state detecting means 35b and the vehicle speed detecting means 35c.

Figure 30A:
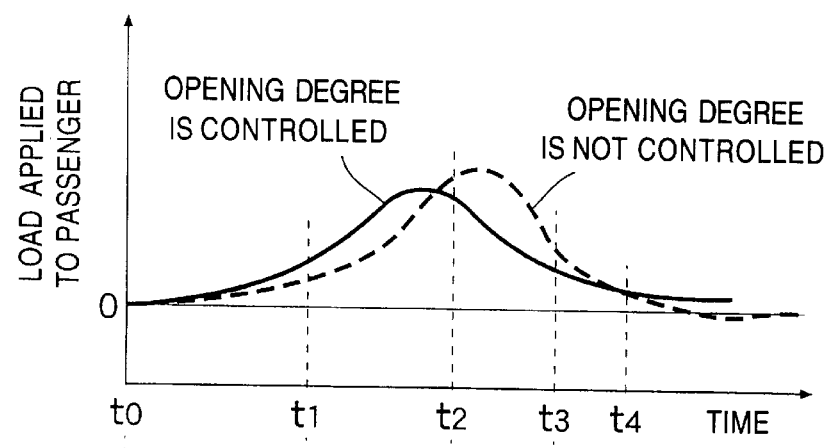
FIGS. 30A–30B are diagrams; showing an example of a pattern of the opening degree of the vent holes.
Figure 30B:
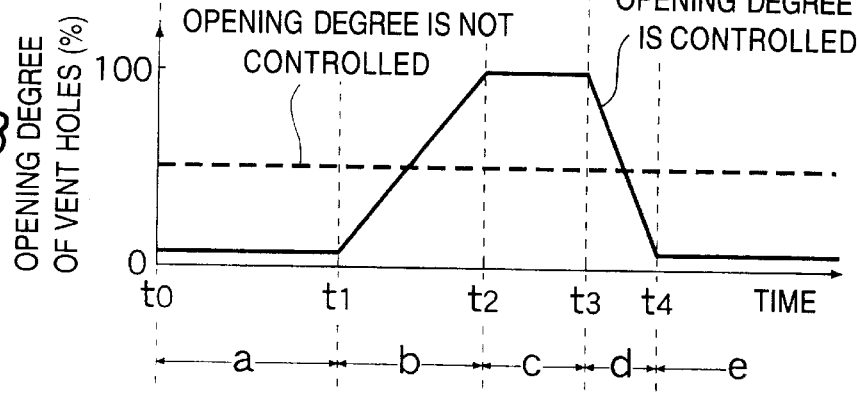

In FIG. 30A, the abscissa indicates the time elapsed after the air bag 21, 48, or 78 completely develops, and the ordinate indicates a load which is applied to the occupant from the air bag 21, 48, or 78. Similarly, the abscissa in FIG. 30B indicates the time elapsed after the air bag 21, 48, or 78 completely develops, and the ordinate indicates the opening degree of the vent holes 29 (the fully opened state is set to 100%). In the figure, the broken lines correspond to prior art devices in which a vent hole of a constant area is formed in the air bag 21, 48, or 78, and the solid lines correspond to the embodiment in which the opening degree of the vent holes 29 formed in the retainer 19 is controlled by the control valve 30.

As seen from the figure, in the embodiment, the opening degree of the vent holes 29 is suppressed to a low level in a zone a between times $t_0$ and $t_1$, so that the gas is hardly discharged from the air bag 21, 48, or 78, thereby increasing the restraining load in the initial stage in which the occupant who is forward moved by the inertia due to a collision begins to press the air bag 21, 48, or 78. In the subsequent zone b between times $t_1$ and $t_2$, the opening degree of the vent holes 29 is increased, and, in the subsequent zone c between times $t_2$ and $t_3$, the opening degree of the vent holes 29 is held to a large value, whereby the maximum value of the restraining load which is applied to the occupant from the air bag 21, 48, or 78 is reduced so that the occupant is gently restrained. In the subsequent zone d between times $t_3$ to $t_4$, the opening degree of the vent holes 29 is reduced, and, in the zone e after time $t_4$, the opening degree of the vent holes 29 is suppressed to a small value so that the gas is hardly discharged from the air bag 21, 48, or 78. As a result, the air bag 21, 48, or 78 is prevented from contracting in an early stage, thereby sufficiently moderating an impact due to a secondary collision of the occupant against the steering wheel, the dashboard, a center pillar, or the like.

As described above, the opening degree of the vent holes 29 is controlled in accordance with the preset pattern of the opening degree. Therefore, the characteristics of the load which is applied to the occupant from the air bag 21, 48, or 78 can be arbitrarily controlled so as to be made close to ideal characteristics.

Figure 31:
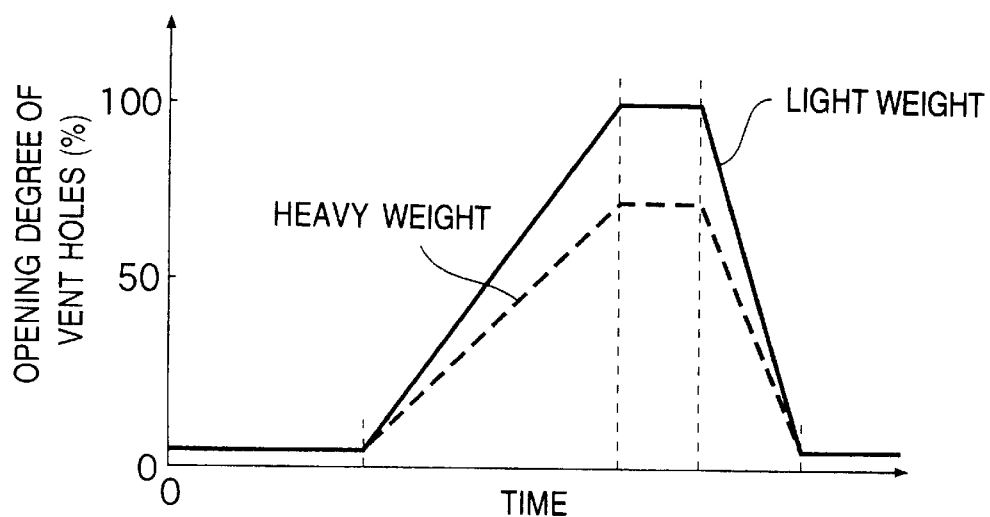
FIG. 31 is a diagram showing a change of the opening degree of the vent hole with respect to the state of a passenger.

The pattern of the opening degree of the vent holes 29 is changed in accordance with the results of the detection conducted by the occupant state detecting means 35b. As shown in FIG. 31, when the occupant is a child having a light weight, the full opening degree of the vent holes 29 in the zone c is set to 100%. By contrast, when the occupant is an adult having a heavy weight, the full opening degree is gradually reduced from 100% to, for example, 70%, as the weight is heavier. This change is conducted because of the following reason. In the case where the occupant has a heavy weight, when the full opening degree of the vent holes 29 is excessively large, the amount of the gas which is discharged through the vent holes 29 by the load that is exerted by the occupant to compress the air bag 21, 48, or 78 becomes too large, thereby producing a possibility that the air bag 21, 48, or 78 cannot be maintained to the inflated state.

Figure 32:
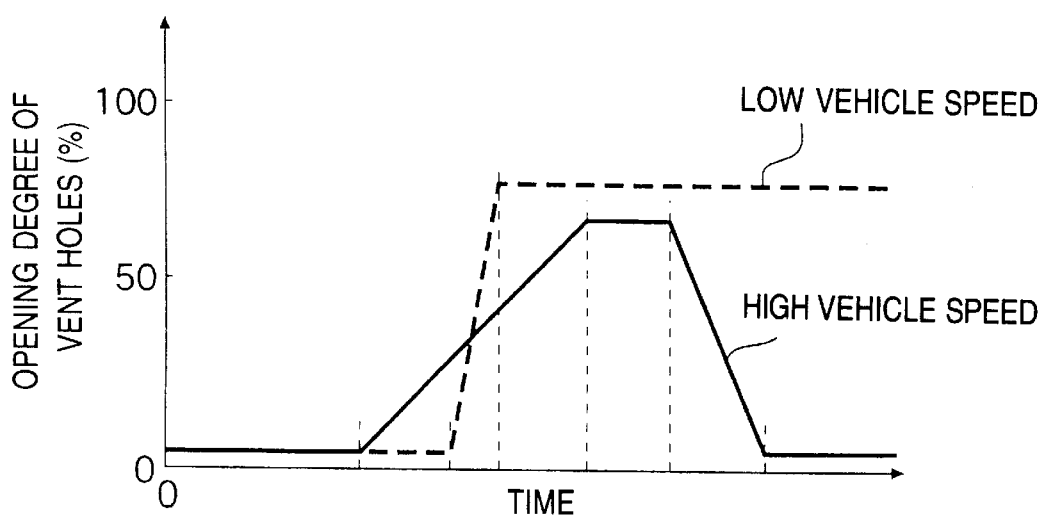
FIG. 32 is a diagram showing a change of the opening degree of the vent hole with respect to the speed of a vehicle.

The pattern of the opening degree of the vent holes 29 is changed in accordance with the results of the detection conducted by the vehicle speed detecting means 35c. As shown in FIG. 32, when the vehicle speed at a collision is low, a small restraining force is required. Therefore, the full opening degree of the vent holes 29 is set to be large, and the full opening degree is maintained until the last stage, whereby the maximum value of the restraining load which is applied to the occupant from the air bag 21, 48, or 78 is reduced so that the occupant is further gently restrained.

In the above, the embodiments of the invention have been described in detail. The present invention may be variously modified without departing from the spirit thereof.

As described above, according to the invention, the amount of the gas which, when a vehicle collides, is generated by the inflator and discharged through the vent hole can be arbitrarily controlled by changing the opening degree of the vent hole by the actuator. Therefore, the development speed of the air bag, the degree of the restraining force of the air bag, the contraction speed of the air bag, and the like can be arbitrarily set in accordance with the condition of the collision and the state of an occupant. Particularly, an actuator configured by a piezoelectric element is simpler in structure than a motor or a solenoid. Therefore, a sure operation can be guaranteed while enabling the number of parts of the actuator to be reduced and the production cost to be lowered.

According to the invention, the plate-like piezoelectric element having a very simple structure can be provided with both a function as a valve element which opens and closes the vent hole, and that as an actuator which drives the valve element. Consequently, the actuator can be miniaturized and reduced in production cost.

According to the invention, the durability of the piezoelectric element which itself is fragile can be enhanced by stacking thereon the protector configured by a metal plate.

According to the invention, the combination of the plural vent holes formed in the retainer and the plural openings formed in the valve plate enables the opening degree of the vent holes to be changed from a fully closed state to a fully opened state or vice versa, only by moving the valve plate with a small stroke. Therefore, miniaturization of the actuator and improvement of the responsibility can be simultaneously attained.

According to the invention, since the valve plate is slid by the actuator, so as to change the opening degree of the vent holes, the amount of the gas which, when a vehicle collides, is generated by the inflator and discharged through the vent holes can be arbitrarily controlled. Therefore, the development space of the air bag, the degree of the restraining force of the air bag, the contraction speed of the air bag, and the like can be arbitrarily set in accordance with the condition of the collision and the state of an occupant. Particularly, the combination of the plural vent holes formed in the retainer and the plural openings formed in the valve plate enables the opening degree of the vent holes to be changed from a fully closed state to a fully opened state or vice versa, only by moving the valve plate with a small stroke. Therefore, miniaturization of the actuator and improvement of the responsibility can be simultaneously attained.

According to the invention, the plural vent holes which are arranged in a circumferential direction are opened and closed by the valve plate which is reciprocally rotated by the actuator. As the actuator, therefore, an actuator of the rotational output type, such as a motor can be easily applied.

According to the invention, the plural vent holes which are arranged in a linear direction are opened and closed by the valve plate which is reciprocally linearly moved by the actuator. As the actuator, therefore, an actuator of the linear output type, such as a linear solenoid or a stacked piezoelectric element can be easily applied.

As described above, according to the invention, the controlling means drives the opening of the control valve by means of the actuator in accordance with the air bag internal pressure detected by the internal-pressure detecting means, so as to change the opening degree of the vent hole, whereby the amount of the gas which is discharged through the vent hole is arbitrarily changed to make the air bag internal pressure coincident with the preset internal-pressure pattern. Therefore, the internal pressure of the air bag can be controlled to an optimum level so that the performance of restraining an occupant can be enhanced.

According to the invention, the opening degree of the vent hole can be controlled so as to obtain the internal pressure of the air bag which corresponds to the state of the occupant. Consequently, the level of the internal pressure of the air bag can be optimally set in accordance with the weight of the occupant and a change of the sitting state.

According to the invention, the opening degree of the vent hole can be controlled so as to obtain the internal pressure of the air bag which corresponds to the speed of the vehicle. Consequently, the level of the internal pressure of the air bag can be optimally set in accordance with the value of the vehicle speed.

According to the invention, since the actuator is configured by a piezoelectric element, opening and closing of the vent hole can be driven at a lower cost and by a simple structure in which the number of parts is smaller than that of an actuator of another kind such as a motor or a solenoid.

According to the invention, since the actuator is configured by a plate-like piezoelectric element, the structure of the actuator can be very simplified, and the piezoelectric element itself can be used as a valve element. Therefore, the number of parts can be further reduced and the production cost can be further lowered.

According to the invention, the combination of the plural vent holes formed in the retainer and the plural openings formed in the valve plate enables the opening degree of the vent holes to be changed from a fully closed state to a fully opened state or vice versa, only by moving the valve plate with a small stroke. Therefore, miniaturization of the actuator and improvement of the responsibility can be simultaneously attained.

According to the invention, the vent holes which are arranged in a circumferential direction are opened and closed by the valve plate which is reciprocally rotated by the actuator. As the actuator, therefore, an actuator of the rotational output type, such as a motor can be easily applied.

According to the invention, the vent holes which are arranged in a linear direction are opened and closed by the valve plate which is reciprocally linearly moved by the actuator. As the actuator, therefore, an actuator of the linear output type, such as a linear solenoid or a stacked piezoelectric element can be easily applied.

The present invention is based on Japanese Patent Applications No. Hei. 10-143786, Hei. 10-143782, and Hei. 10-143785 which are incorporated herein by reference.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. An air bag device comprising:
   a folded air bag;
   a retainer to which a periphery of an opening of a folded air bag is fixed;
   an inflator housed in said retainer for generating a gas to develop said air bag when a vehicle is subject to a predetermined acceleration or more;
   an actuating member for opening and closing a vent hole formed in said retainer; and
   a controller for controlling said actuating member so as to adjust an opening degree of said vent hole, wherein said actuating member comprises a piezoelectric element.

2. An air bag device according to claim 1, wherein said piezoelectric element has a cantilever plate shape for opening and closing said vent hole and has one end fixed to said retainer.

3. An air bag device according to claim 2, wherein a protector made of metal is stacked on said piezoelectric element.

4. An air bag device comprising:

a folded air bag;

a retainer to which a periphery of an opening of a folded air bag is fixed;

an inflator housed in said retainer for generating a gas to develop said air bag when a vehicle is subject to a predetermined acceleration or more;

an actuating member for opening and closing a vent hole formed in said retainer;

a controller for controlling said actuating member so as to adjust an opening degree of said vent hole; and internal-pressure detecting means for detecting an internal pressure of said air bag, wherein said actuating member comprises an actuator and a control valve which is operated by said actuator to open and close said vent hole, and said controller comprises a controlling means for feedback controlling said opening degree of said vent hole so that the air bag internal pressure detected by said internal-pressure detecting means coincides with a preset internal-pressure pattern.

5. An air bag device according to claim 4, further comprising:

occupant state detecting means for detecting a state of the occupant, wherein said controlling means changes the internal-pressure pattern in accordance with the state of the occupant detected by said occupant state detecting means.

6. An air bag device according to claim 4, further comprising:

vehicle speed detecting means for detecting a speed of a vehicle, wherein said controlling means changes the internal-pressure pattern in accordance with the speed of the vehicle detected by said vehicle speed detecting means.

7. An air bag device according to claim 4, wherein said actuator is a piezoelectric element.

8. An air bag device according to claim 7, wherein said piezoelectric element has a plate shape which is placed so as to cover said vent hole, and in which one end is fixed to said retainer.

9. An air bag device according to claim 4, wherein said vent hole has plural vent holes formed in said retainer, a valve plate having plural openings respectively corresponding to said vent holes is slidably supported on said retainer, and said valve plate is slid by said actuating member, thereby adjusting a total opening degree of said vent holes.

10. An air bag device according to claim 4, wherein said vent hole has plural vent holes formed in said retainer; and said actuating member comprises, a valve plate in which plural openings respectively corresponding to said plural vent holes are formed, and an actuator for sliding said valve plate along said retainer to cause said plural openings to oppose said plural vent holes.

11. An air bag device according to claim 10, wherein said plural vent holes are arranged in a circumferential direction, and said valve plate is rotated by said actuator so as to make the plural vent holes coincide with said plural openings respectively.

12. An air bag device according to claim 10, wherein said plural vent holes are arranged in a linear direction, and said valve plate is linearly moved by said actuator.

13. An air bag device according to claim 4, wherein said retainer comprises plural vent holes, a valve plate in which plural openings respectively corresponding to said plural vent holes are formed is provided, and said actuator slides said valve plate along said retainer to cause said plural openings to oppose said plural vent holes.

14. An air bag device according to claim 13, wherein said plural vent holes are arranged in a circumferential direction, and said valve plate is reciprocally rotated by said actuator.

15. An air bag device according to claim 13, wherein said plural vent holes are arranged in a linear direction, and said valve plate is reciprocally linearly moved by said actuator.

16. An air bag device in which an inflator is housed in a retainer to which a periphery of an opening of a folded air bag is fixed, and said air bag is inflated to develop by a gas which is generated by said inflator when a vehicle collides, thereby restraining an occupant, wherein said device comprises:

a vent hole formed in said retainer;

a control valve which is operated by an actuator to open and close said vent hole;

internal-pressure detecting means for detecting an internal pressure of said air bag; and controlling means for feedback controlling an opening degree of said vent hole so that the air bag internal pressure detected by said internal-pressure detecting means coincides with a preset internal-pressure pattern.

* * * * *